US012356227B2

United States Patent
Rahman et al.

(10) Patent No.: US 12,356,227 B2
(45) Date of Patent: Jul. 8, 2025

(54) UPLINK TRANSMIT BEAM SELECTION BASED ON DOWNLINK AND UPLINK RESOURCE SIGNAL MEASUREMENTS

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US); Gilwon Lee, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 17/364,864

(22) Filed: Jun. 30, 2021

(65) Prior Publication Data

US 2022/0014956 A1 Jan. 13, 2022

Related U.S. Application Data

(60) Provisional application No. 63/050,062, filed on Jul. 9, 2020.

(51) Int. Cl.
*H04W 24/10* (2009.01)
*H04L 5/00* (2006.01)
*H04W 72/044* (2023.01)

(52) U.S. Cl.
CPC ........... *H04W 24/10* (2013.01); *H04L 5/0048* (2013.01); *H04W 72/046* (2013.01)

(58) Field of Classification Search
CPC ..... H04W 24/10; H04W 72/046; H04W 8/24; H04W 72/51; H04L 5/0048; H04L 5/0023;
(Continued)

(56) References Cited

U.S. PATENT DOCUMENTS

| 2015/0043463 A1* | 2/2015 | Yamazaki | H04B 7/0452 370/329 |
| 2016/0338107 A1* | 11/2016 | Zeng | H04W 72/1268 |

(Continued)

FOREIGN PATENT DOCUMENTS

| WO | 2020037207 A1 | 2/2020 |
| WO | 2020069075 A1 | 4/2020 |

OTHER PUBLICATIONS

U.S. Appl. No. 63/008,518, filed Apr. 10, 2020 (Year: 2020).*
(Continued)

*Primary Examiner* — Sun Jong Kim

(57) ABSTRACT

A method for operating a user equipment comprises transmitting a capability information including a total number ($X_{tot}$) of transmit-receive (Tx-Rx) entities at the UE; receiving, based on the capability information, configuration information including information on reporting a selection of Y Tx-Rx entities; selecting, based on the configuration information, the Y Tx-Rx entities; determining a report including an indication about the selection of the Y Tx-Rx entities; and transmitting the report, wherein the Y Tx-Rx entities are selected from X Tx-Rx entities that comprise all of or a subset of the $X_{tot}$ Tx-Rx entities at the UE, and $X \le X_{tot}$.

12 Claims, 18 Drawing Sheets

(58) Field of Classification Search
CPC .. H04B 7/0628; H04B 7/0691; H04B 7/0695; H04B 7/0404; H04B 17/309
See application file for complete search history.

(56) References Cited

U.S. PATENT DOCUMENTS

| | | | | |
|---|---|---|---|---|
| 2018/0262259 | A1* | 9/2018 | Sano | H04W 16/28 |
| 2019/0372734 | A1* | 12/2019 | Choi | H04B 7/0628 |
| 2020/0067615 | A1* | 2/2020 | Ghanbarinejad | H04B 17/309 |
| 2020/0106168 | A1 | 4/2020 | Hakola et al. | |
| 2020/0107327 | A1 | 4/2020 | Wang et al. | |
| 2021/0168714 | A1* | 6/2021 | Guan | H04B 7/0404 |
| 2021/0320702 | A1* | 10/2021 | Zhou | H04B 7/0626 |
| 2022/0216963 | A1* | 7/2022 | Chen | H04L 5/0023 |
| 2022/0278719 | A1* | 9/2022 | Li | H04W 4/40 |
| 2023/0045308 | A1* | 2/2023 | Guan | H04L 5/0051 |
| 2023/0105787 | A1* | 4/2023 | Chen | H04L 5/0094 370/329 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.5.0, Mar. 2021, 255 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.
"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.5.0 Release 16)", ETSI TS 138 211 V16.5.0, Apr. 2021, 138 pages.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
International Search Report and Written Opinion of the International Searching Authority in connection with International Application No. PCT/KR2021/008839 issued Oct. 19, 2021, 7 pages.
Extended European Search Report issued Dec. 4, 2023 regarding Application No. 21838889.0, 9 pages.

* cited by examiner

UPLINK TRANSMIT BEAM SELECTION BASED ON DOWNLINK AND UPLINK RESOURCE SIGNAL MEASUREMENTS

CROSS-REFERENCE TO RELATED APPLICATIONS AND CLAIM OF PRIORITY

The present application claims priority to U.S. Provisional Patent Application No. 63/050,062, filed on Jul. 9, 2020. The content of the above-identified patent document is incorporated herein by reference.

TECHNICAL FIELD

The present disclosure relates generally to wireless communication systems and more specifically to uplink transmit beam selection.

BACKGROUND

Understanding and correctly estimating the channel between a user equipment (UE) and a gNode B (gNB) is important for efficient and effective wireless communication. In order to correctly estimate the downlink (DL) channel conditions, the gNB may transmit a reference signal, e.g., CSI-RS, to the UE for DL channel measurement, and the UE may report (e.g., feedback) information about channel measurement, e.g., CSI, to the gNB. Likewise, for uplink (UL), the UE may transmit reference signal, e.g., SRS, to the gNB for UL channel measurement. With the DL and UL channel measurements, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beam-formed systems, a beam indication mechanism is needed in order to align the spatial beams at both gNB and UE.

SUMMARY

Embodiments of the present disclosure provide methods and apparatuses to enable uplink transmit beam selection.

In one embodiment, a UE in a wireless communication system is provided. The UE includes a transceiver configured to: transmit a capability information including a total number ($X_{tot}$) of transmit-receive (Tx-Rx) entities at the UE; and receive, based on the capability information, configuration information including information on reporting a selection of Y Tx-Rx entities. The UE further includes a processor operably coupled to the transceiver. The processor is configured to: select, based on the configuration information, the Y Tx-Rx entities; and determine a report including an indication about the selection of the Y Tx-Rx entities; wherein the transceiver is further configured to transmit the report, and wherein the Y Tx-Rx entities are selected from X Tx-Rx entities that comprise all of or a subset of the $X_{tot}$ Tx-Rx entities at the UE, and $X \leq X_{tot}$.

In another embodiment, a BS in a wireless communication system is provided. The BS includes a transceiver configured to: receive a capability information including a total number ($X_{tot}$) of transmit-receive (Tx-Rx) entities at a user equipment (UE). The BS further includes a processor operably coupled to the transceiver. The processor is configured to: generate, based on the capability information, configuration information including information on reporting a selection of Y transmit-receive (Tx-Rx) entities. The transceiver is further configured to: transmit the configuration information; and receive a report including an indication about the selection of the Y Tx-Rx entities from X Tx-Rx entities that comprise all of or a subset of the $X_{tot}$ Tx-Rx entities at the UE, and $X \leq X_{tot}$.

In yet another embodiment, a method for operating a UE is provided. The method comprises: transmitting a capability information including a total number ($X_{tot}$) of transmit-receive (Tx-Rx) entities at the UE; receiving, based on the capability information, configuration information including information on reporting a selection of Y Tx-Rx entities; selecting, based on the configuration information, the Y Tx-Rx entities; determining a report including an indication about the selection of the Y Tx-Rx entities; and transmitting the report, wherein the Y Tx-Rx entities are selected from X Tx-Rx entities that comprise all of or a subset of the $X_{tot}$ Tx-Rx entities at the UE, and $X \leq X_{tot}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
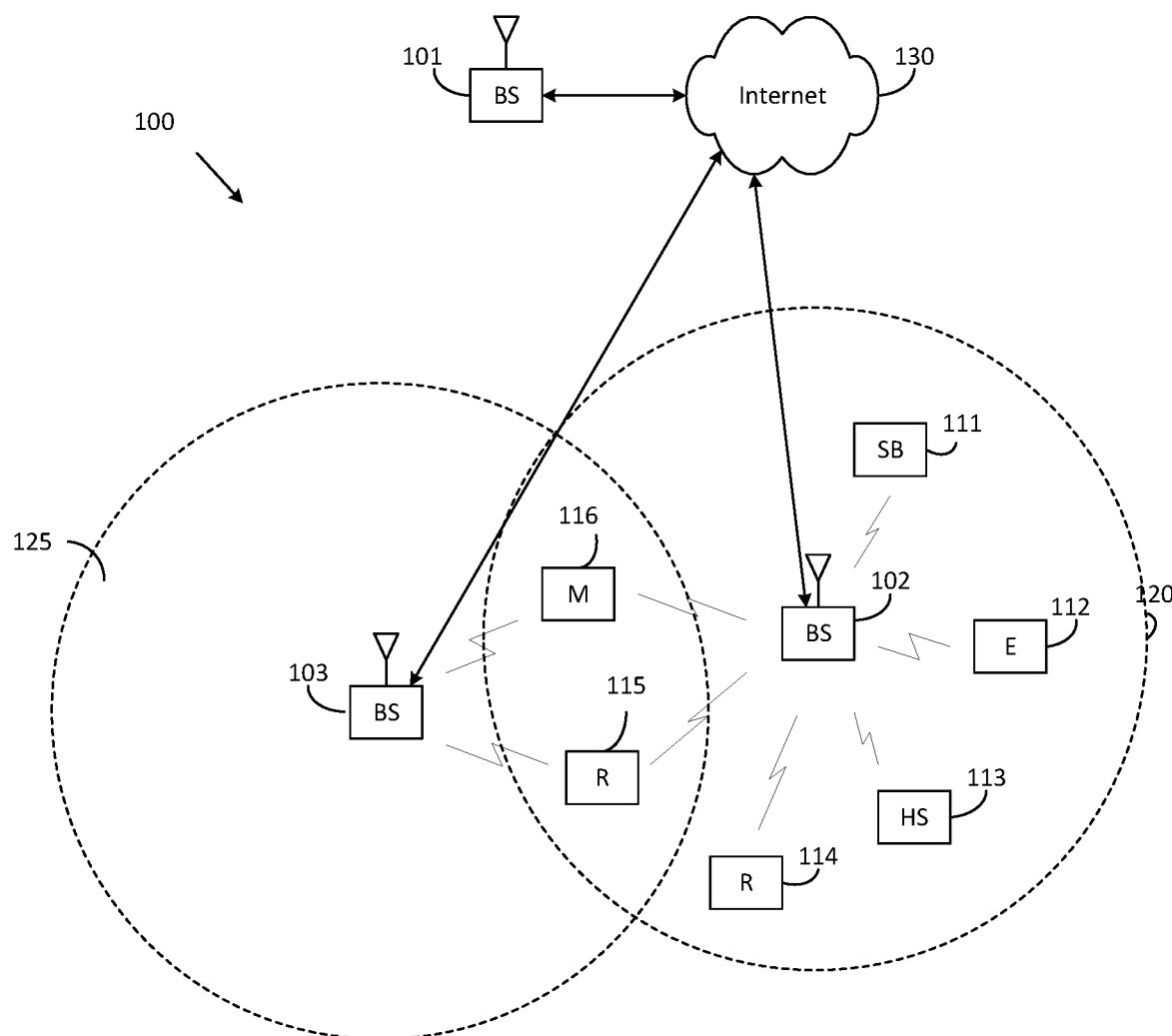
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.5.0, "E-UTRA, Physical channels and modulation" (herein "REF 1"); 3GPP TS 36.212 v16.5.0, "E-UTRA, Multiplexing and Channel coding" (herein "REF 2"); 3GPP TS 36.213 v16.5.0, "E-UTRA, Physical Layer Procedures" (herein "REF 3"); 3GPP TS 36.321 v16.4.0, "E-UTRA, Medium Access Control (MAC) protocol specification" (herein "REF 4"); 3GPP TS 36.331 v16.4.0, "E-UTRA, Radio Resource Control (RRC) protocol specification" (herein "REF 5"); 3GPP TS 38.211 v16.5.0, "NR, Physical channels and modulation" (herein "REF 6"); 3GPP TS 38.212 v16.5.0, "NR, Multiplexing and Channel coding" (herein "REF 7"); 3GPP TS 38.213 v16.4.0, "NR, Physical Layer Procedures for Control" (herein "REF 8"); 3GPP TS 38.214 v16.4.0, "NR, Physical Layer Procedures for Data" (herein "REF 9"); 3GPP TS 38.215 v16.4.0, "NR, Physical Layer Measurements" (herein "REF 10"); 3GPP TS 38.321 v16.4.0, "NR, Medium Access Control (MAC) protocol specification" (herein "REF 11"); and 3GPP TS 38.331 v16.4.1, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
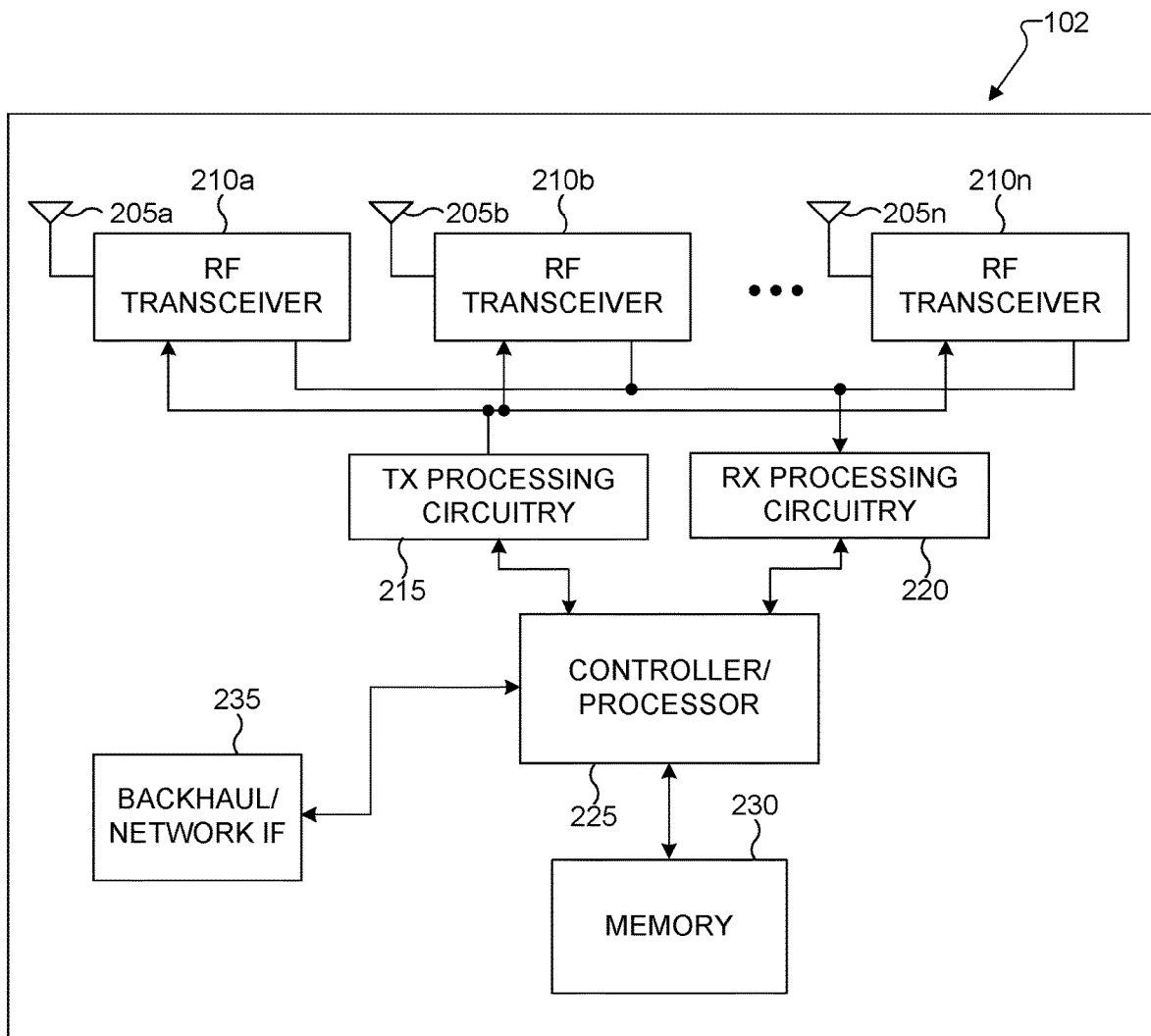
FIG. 2 illustrates an example gNB according to embodiments of the present disclosure.
Figure 3:
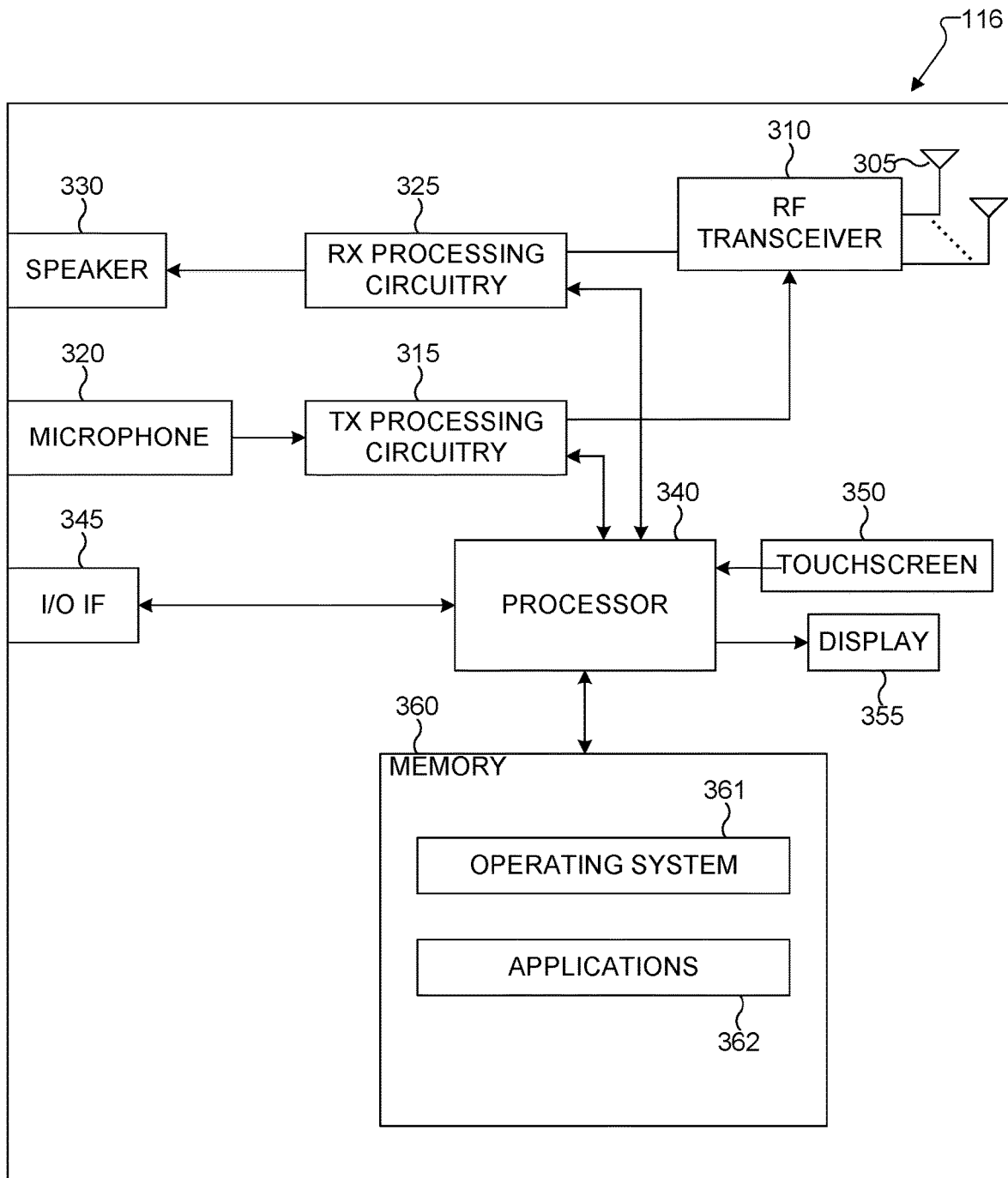
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for transmitting a capability information including a total number ($X_{tot}$) of transmit-receive (Tx-Rx) entities at the UE; receiving, based on the capability information, configuration information including information on reporting a selection of Y Tx-Rx entities; selecting, based on the configuration information, the Y Tx-Rx entities; determining a report including an indication about the selection of the Y Tx-Rx entities; and transmitting the report, wherein the Y Tx-Rx entities are selected from X Tx-Rx entities that comprise all of or a subset of the $X_{tot}$ Tx-Rx entities at the UE, and $X \leq X_{tot}$. One or more of the gNBs 101-103 includes circuitry, programing, or a combination thereof, for receiving a capability information including a total number ($X_{tot}$) of transmit-receive (Tx-Rx) entities at a user equipment (UE); generating, based on the capability information, configuration information including information on reporting a selection of Y transmit-receive (Tx-Rx) entities; transmitting the configuration information; and receiving a report including an indication about the selection of the Y Tx-Rx entities from X Tx-Rx entities that comprise all of or a subset of the $X_{tot}$ Tx-Rx entities at the UE, and $X \leq X_{tot}$.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-

103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for transmitting a capability information including a total number ($X_{tot}$) of transmit-receive (Tx-Rx) entities at the UE; receiving, based on the capability information, configuration information including information on reporting a selection of Y Tx-Rx entities; selecting, based on the configuration information, the Y Tx-Rx entities; determining a report including an indication about the selection of the Y Tx-Rx entities; and transmitting the report, wherein the Y Tx-Rx entities are selected from X Tx-Rx entities that comprise all of or a subset of the $X_{tot}$ Tx-Rx entities at the UE, and $X \leq X_{tot}$. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
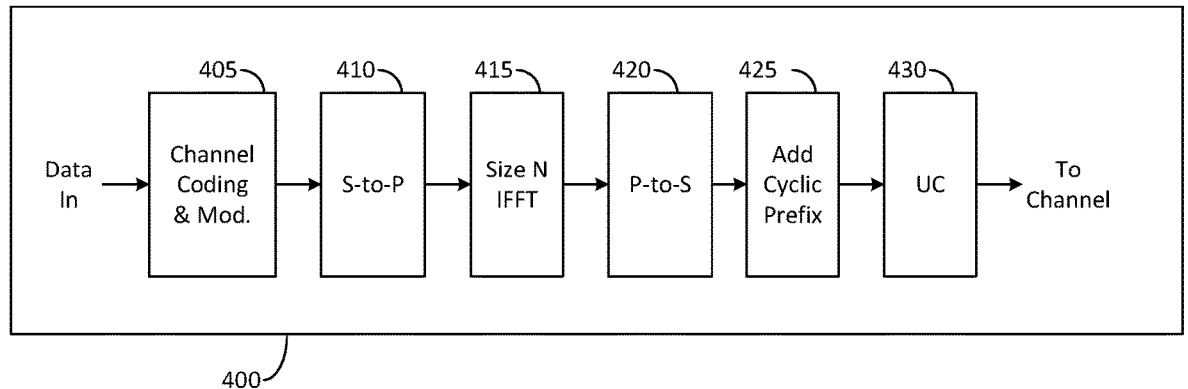
FIG. 4A illustrates a high-level diagram of an orthogonal frequency division multiple access transmit path according to embodiments of the present disclosure.
Figure 4B:
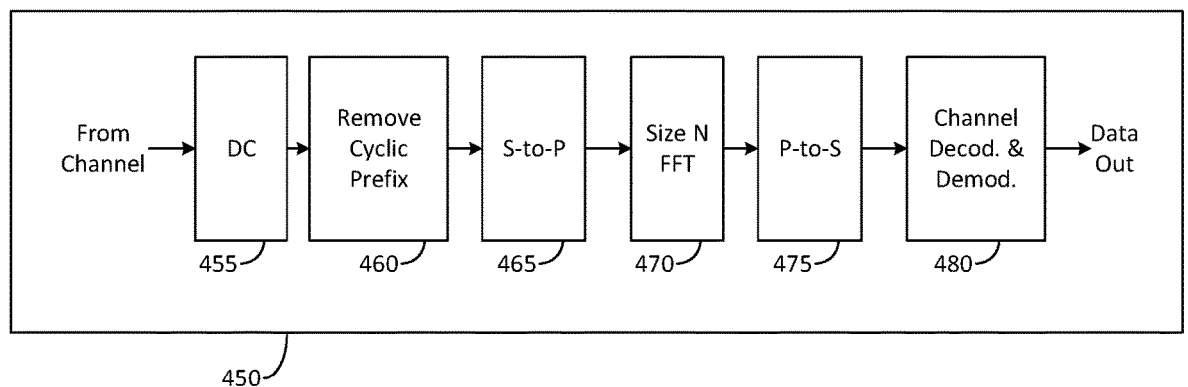
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (B Ss) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ subcarriers, or resource elements (REs), such as 12 REs. A unit of one RB over one subframe is referred to as a PRB. A UE can be allocated $n_s = (n_{s0} + y \cdot N_{EPDCCH}) \mod D$ RBs for a total of $Z = O_F + \lfloor (n_{s0} + y \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB} = 1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$, where $N_{SRS} = 1$ if a last subframe symbol is used to transmit SRS and $N_{SRS} = 0$ otherwise.

Figure 5:
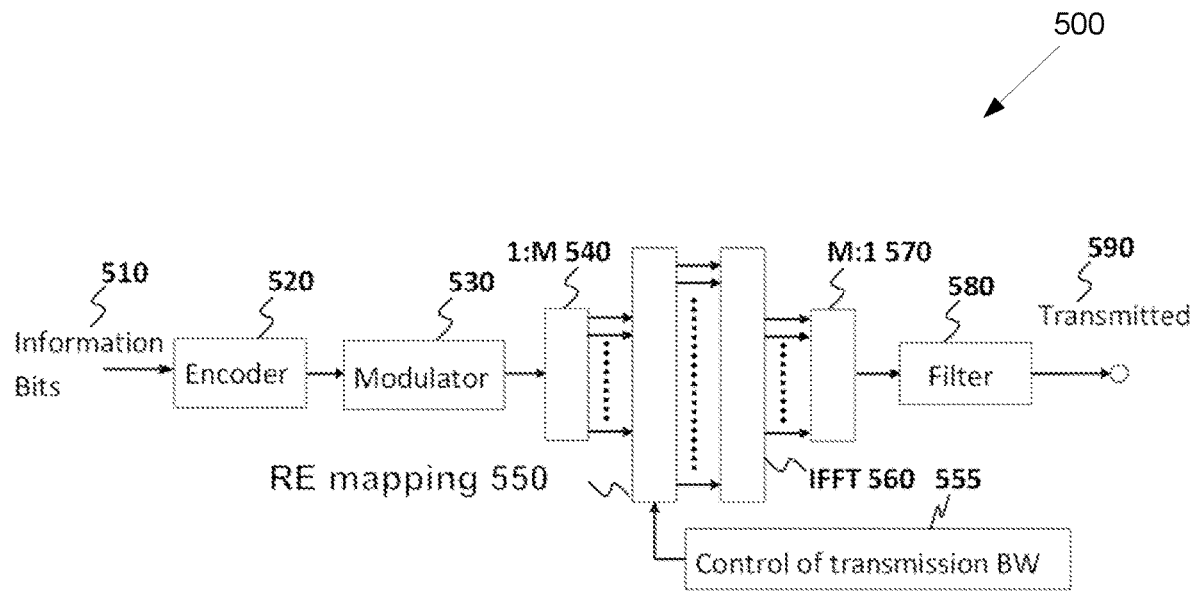
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
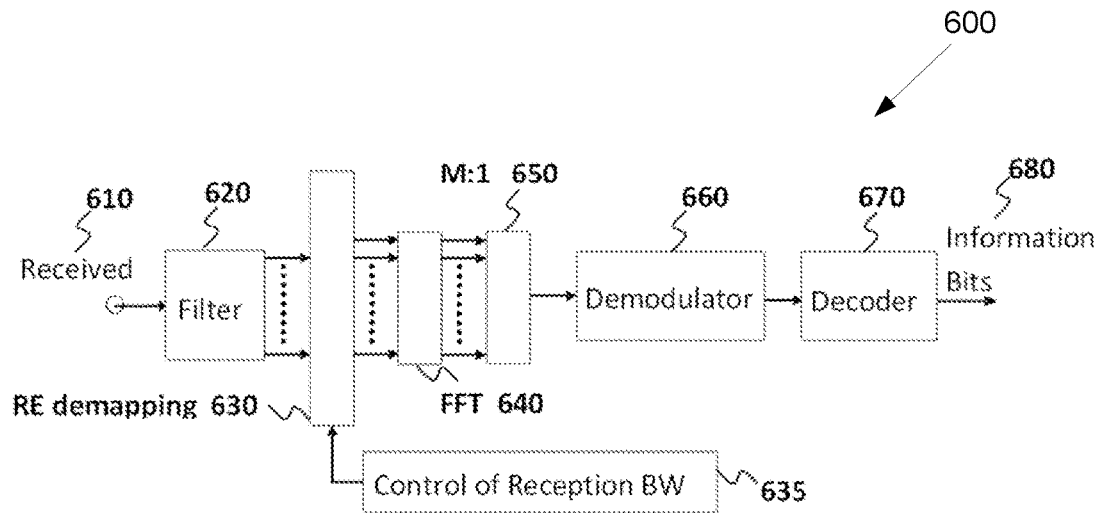
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
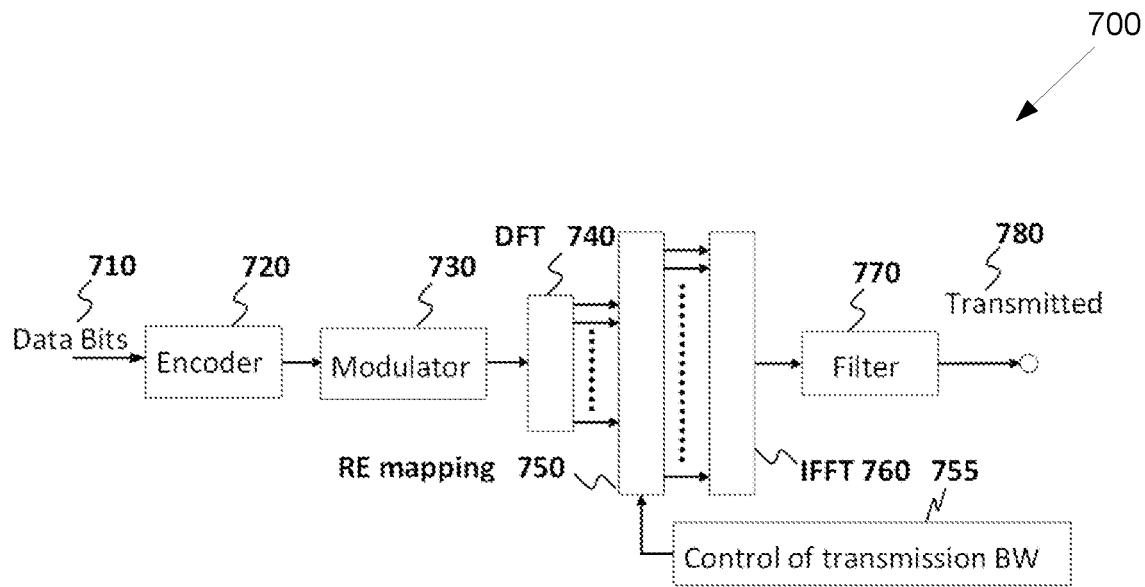
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
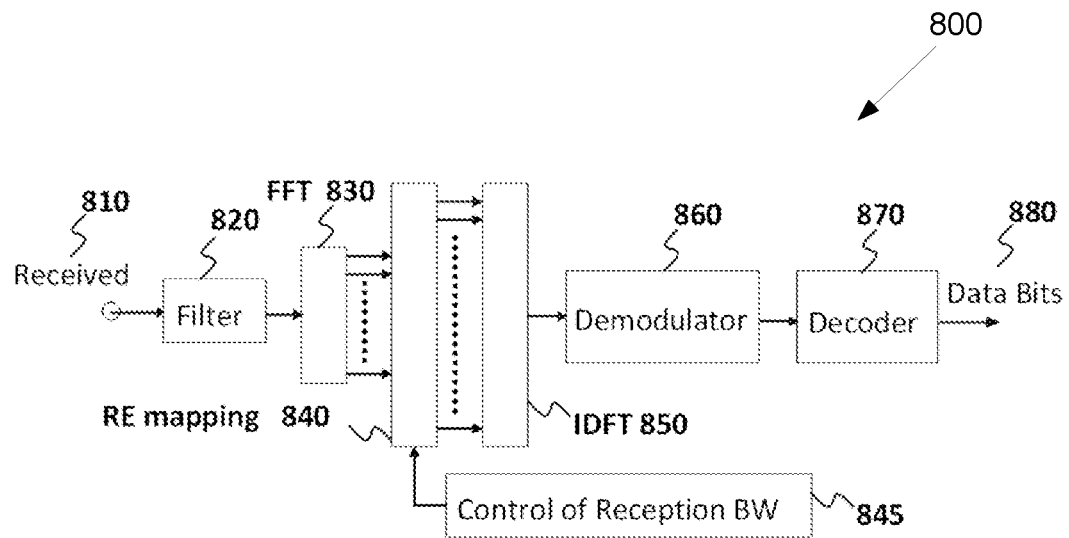
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
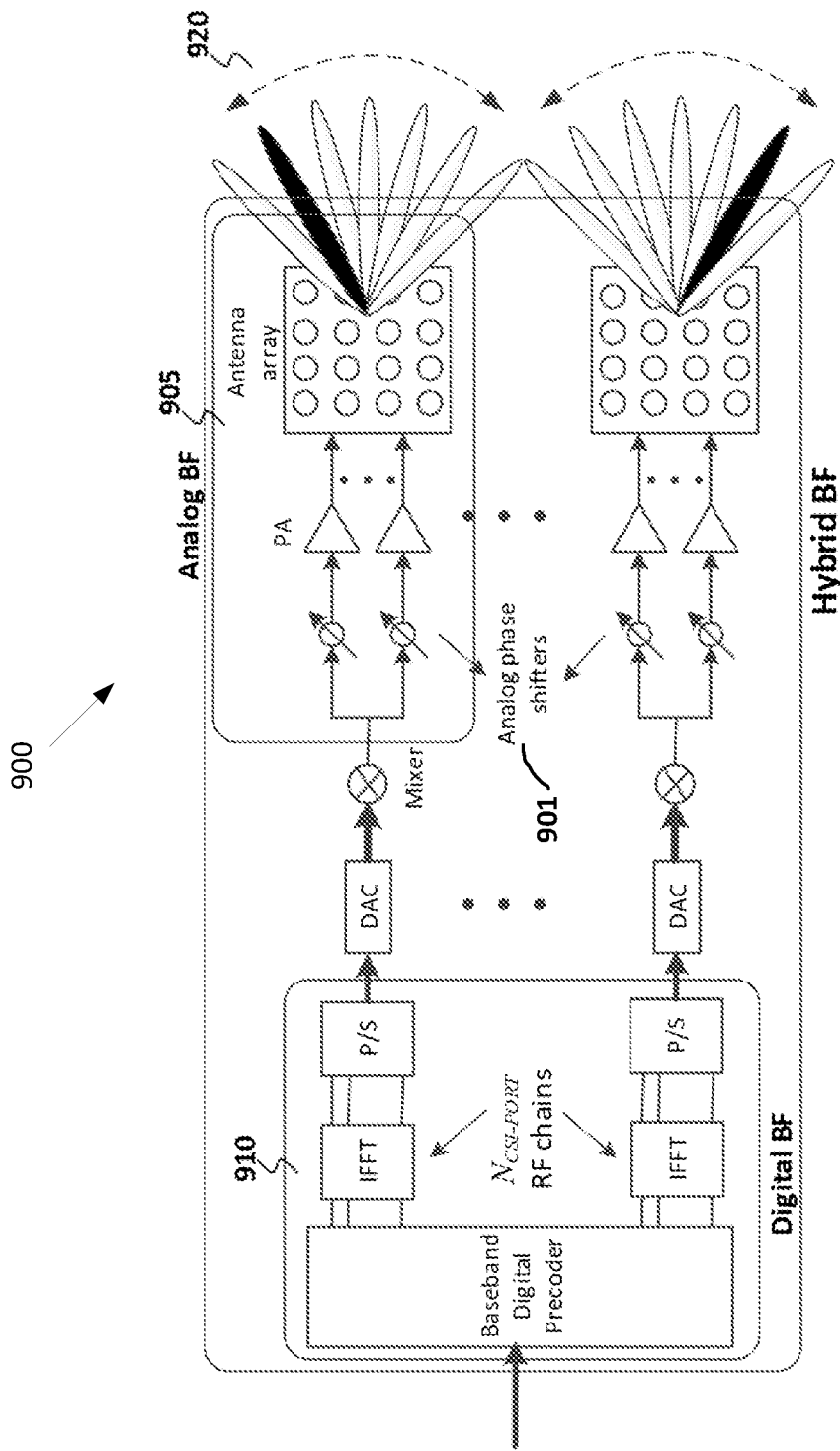
FIG. 9 illustrates an example of a beam-based system according to embodiments of the present disclosure.

FIG. 9 illustrates an example of beams 900 according to embodiments of the present disclosure. The embodiment of the beams 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the beams 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example, when beam correspondence is utilized, UL beam selection can be performed via measuring DL RS (CSI-RS and/or SSB) and CRI reporting accompanied with corresponding beam metrics (e.g., RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or /SINR). Likewise, the UE can assume that the NW knows about this UE selection. Therefore, there is no need for a separate UL beam indication (e.g., via the SRI field or the UL-TCI field in the respective UL grant).

In the 3GPP NR specification, when beam correspondence is not utilized, UL beam selection can be performed via the NW selecting the UL TX beam and indicating it to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an (alternate) UL TX beam different from what the NW expects, some additional mechanisms are needed to ensure that (a) the UE has the alternate UL TX beam available when the UE detects such an event and the next UL TX beam indication can only in a later time slot, and (b) the NW is aware of the UE decision. A few examples of such an event are as follows.

In one example, such an event can happen due to the so-called Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such an event can happen due to hardware (HW) limitation at a UE equipped with multiple antenna panels, and in response to the event, the UE needs to select/switch antenna panel for UL transmission.

In yet another example, such an event can happen due to potential beam failure, and to avoid beam failure, the UE needs to select/switch antenna panel for UL transmission.

In yet another example, such an event can happen due to a sudden change in channel conditions (e.g., due to high speed, antenna/panel blockage, etc.) which may result in beam failure, and the UE needs to switch/change TX beam in order to continue UL transmission without interruptions/failures or having to wait for the next UL TX beam update/indication.

Therefore, there is a need for efficient designs for enabling UL TX beam selection in order to avoid outage (or beam failure), loss in UL throughput, loss in UL coverage, and issues related to HW, that may happen due to the events mentioned above. In this disclosure, several example embodiments are proposed for such designs.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assignment represented by a TCI state, the UE applies the known characteristics of the reference RS to the assigned DL transmission. In an alternative, the reference RS included in a TCI state is referred to as a source RS (e.g., to distinguish an RS included in a TCI state from an RS configured for beam measurement/reporting). The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
| --- | --- |
| FR1 | 450 MHz-6000 MHz |
| FR2 | 24250 MHz-52600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
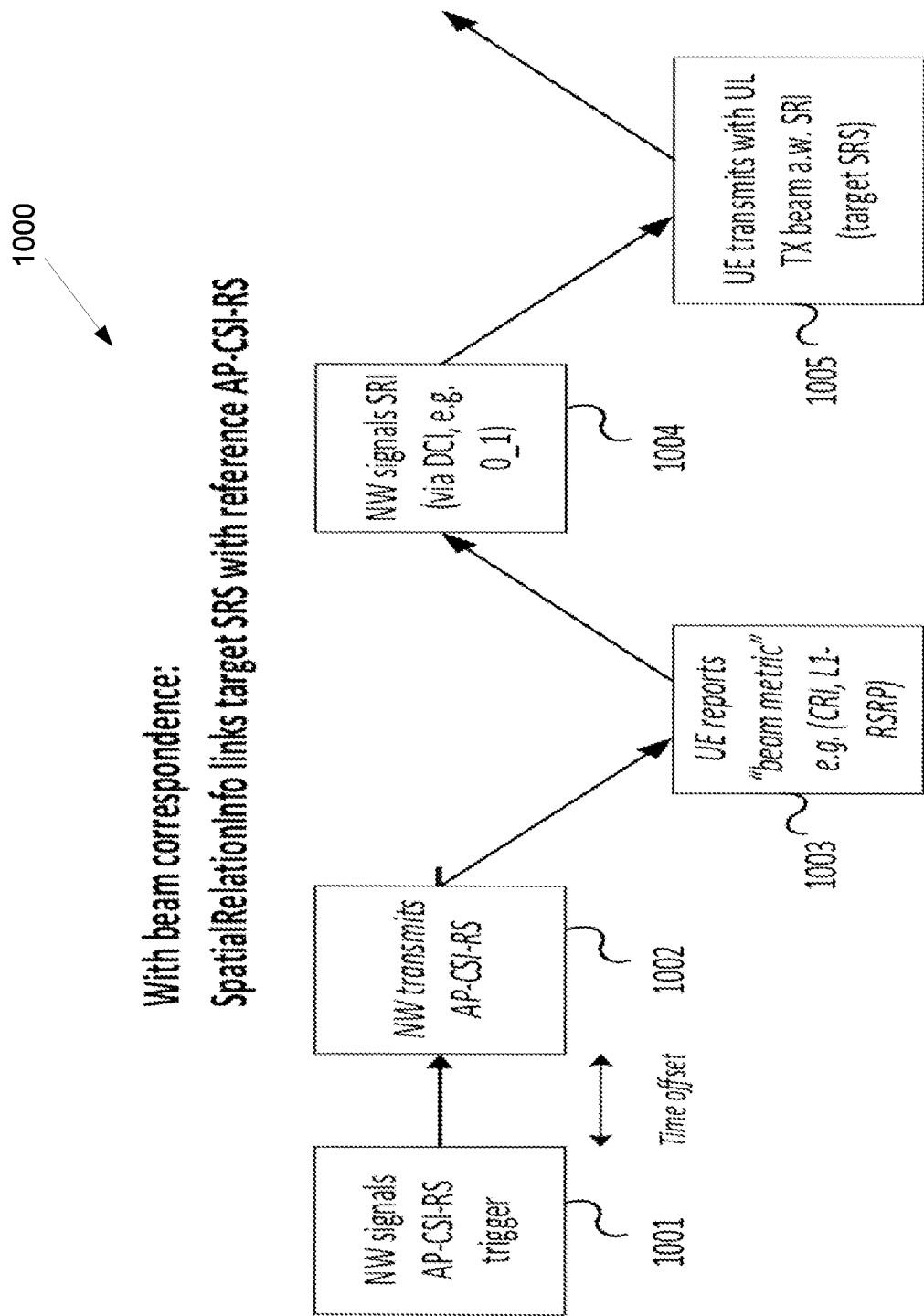
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
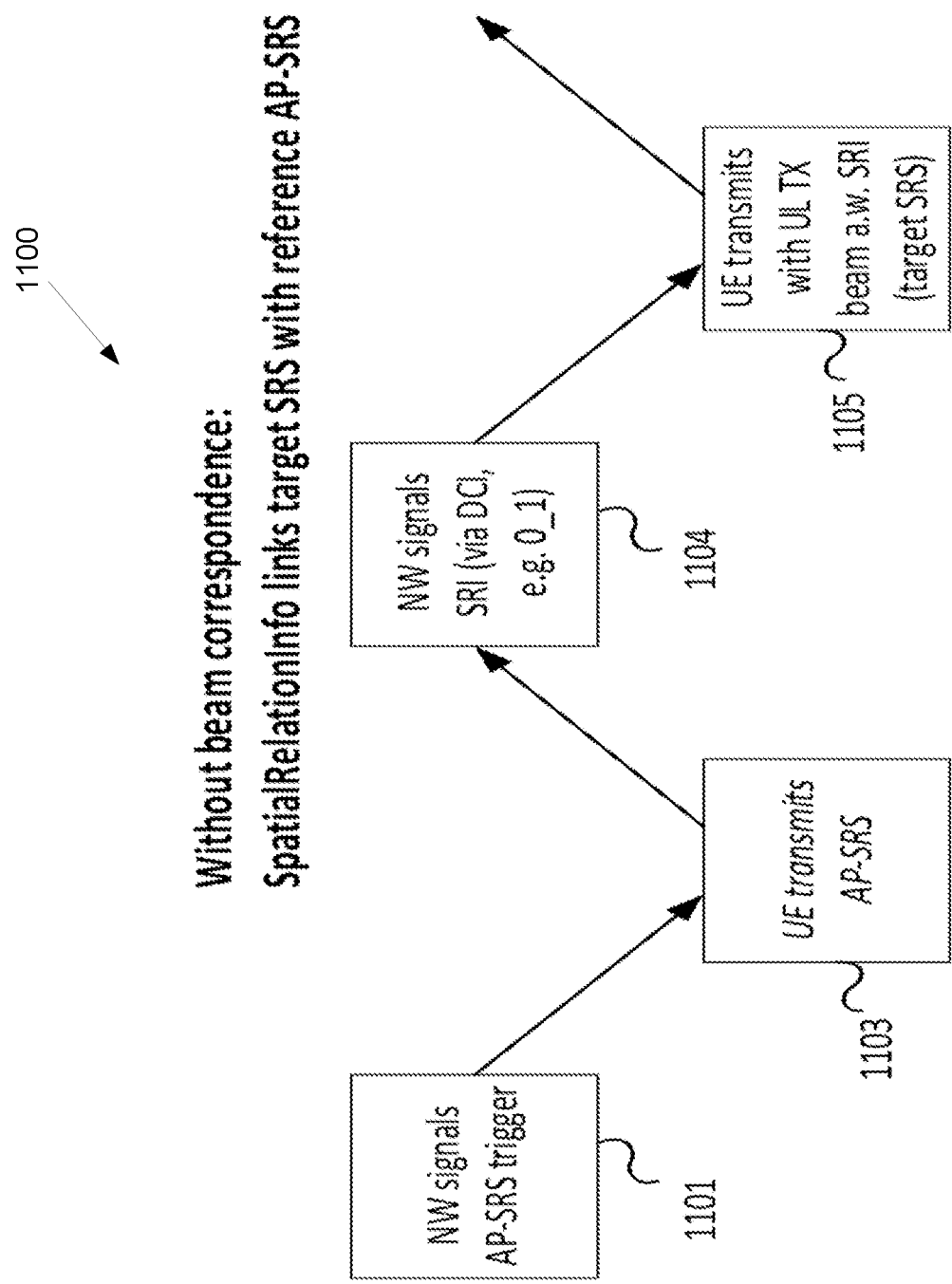
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
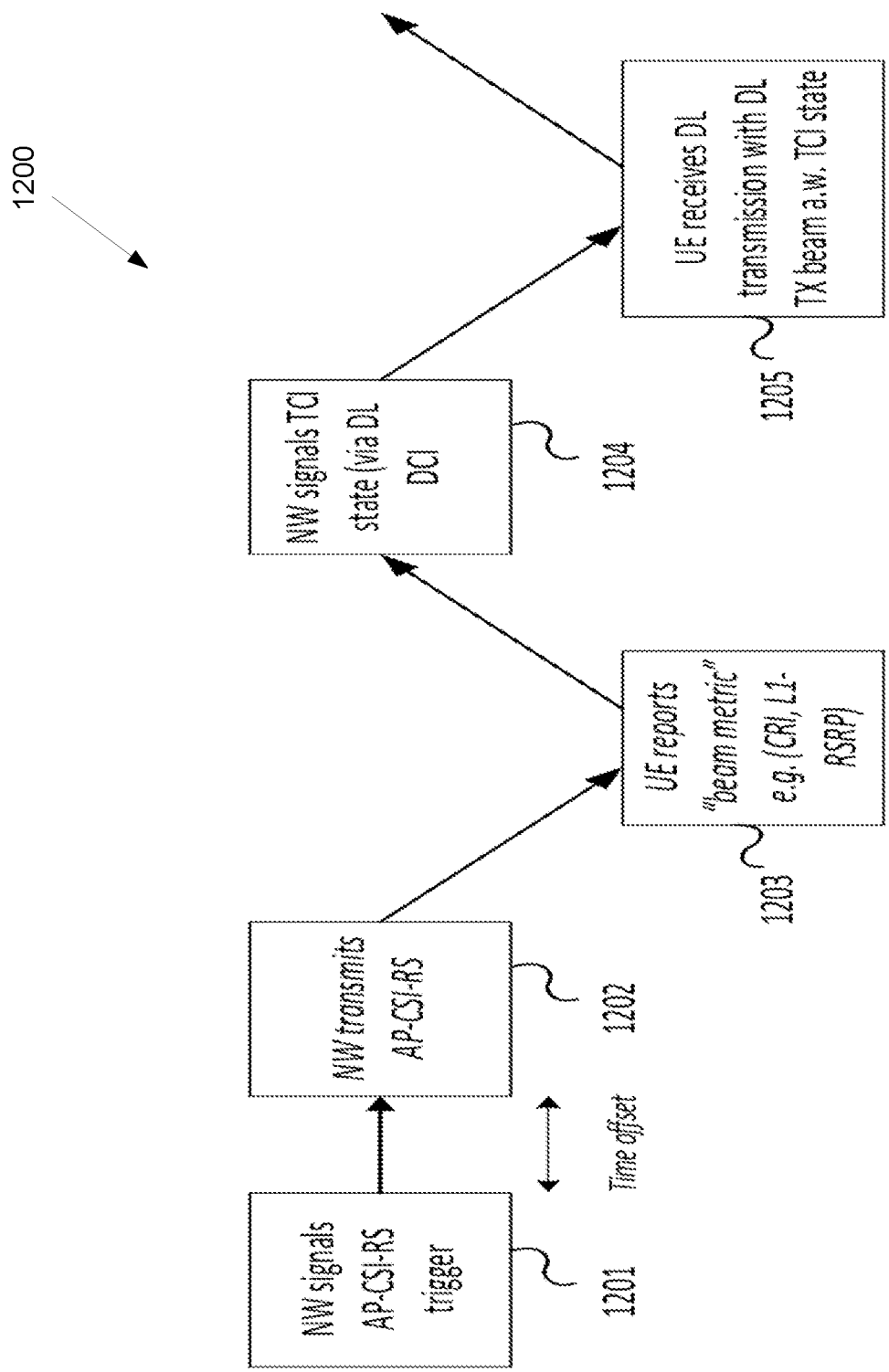
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset).

Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

In the above two example embodiments illustrated in FIGS. 10 and 11, only one UL TX beam is indicated to the UE. The SRI used in embodiments illustrated in FIGS. 10 and 11 can also be replaced with UL-TCI wherein an UL-TCI field can be introduced in the pertinent UL-related DCI(s), either in place of or in addition to the SRI field in the 3GPP NR specification.

The aperiodic CSI-RS (along with the associated aperiodic reporting) in the embodiment illustrated in FIG. 10 and the aperiodic SRS in the embodiment illustrated in FIG. 1100 can be substituted with that of another time-domain behavior such as semi-persistent (SP) or periodic (P).

In any of the embodiments or sub-embodiments or examples below, a flowchart is used for illustrative purposes. The present disclosure covers any possible variation of the flowchart as long as at least some of the components are included. Such components include the UL TX beam indication indicating multiple UL TX beams and the event-dependent UL TX beam switch from the indicated multiple UL TX beams.

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

The term 'antenna panel' refers to a group of antenna ports or a group of antenna elements. In one example, there is a single antenna panel comprising a dual-polarized (i.e. two) antennae/ports. In one example, there are multiple antenna panels (e.g. 2 or 3 or 4), each comprising one or multiple single-polarized or co-polarized antennae/ports. In another example, there are multiple antenna panels (e.g. 2 or 3 or 4), each comprising one or multiple dual-polarized antennae/ports. The multiple antenna panels can point in different directions or can be located on different sides (faces) of a device (e.g. UE). In one example, an antenna panel corresponds to a Tx-Rx entity or vice versa. In one example, an antenna panel corresponds to a RS resource or a set of RS resources, or vice versa. In one example, a Tx-Rx entity corresponds to a RS resource or a set of RS resources, or vice versa.

The present disclosure includes the following components for efficient designs for enabling UL TX beam selection procedures.

Component 1—UE Procedures for UL Panel (or UL Resource or UL Resource Set) Selection Based on DL Measurement RS In the first component, example embodiments for UL antenna panel (or UL resource or UL resource set) selection are provided, wherein this selection is performed based on DL measurement RS resource(s).

Figure 13:
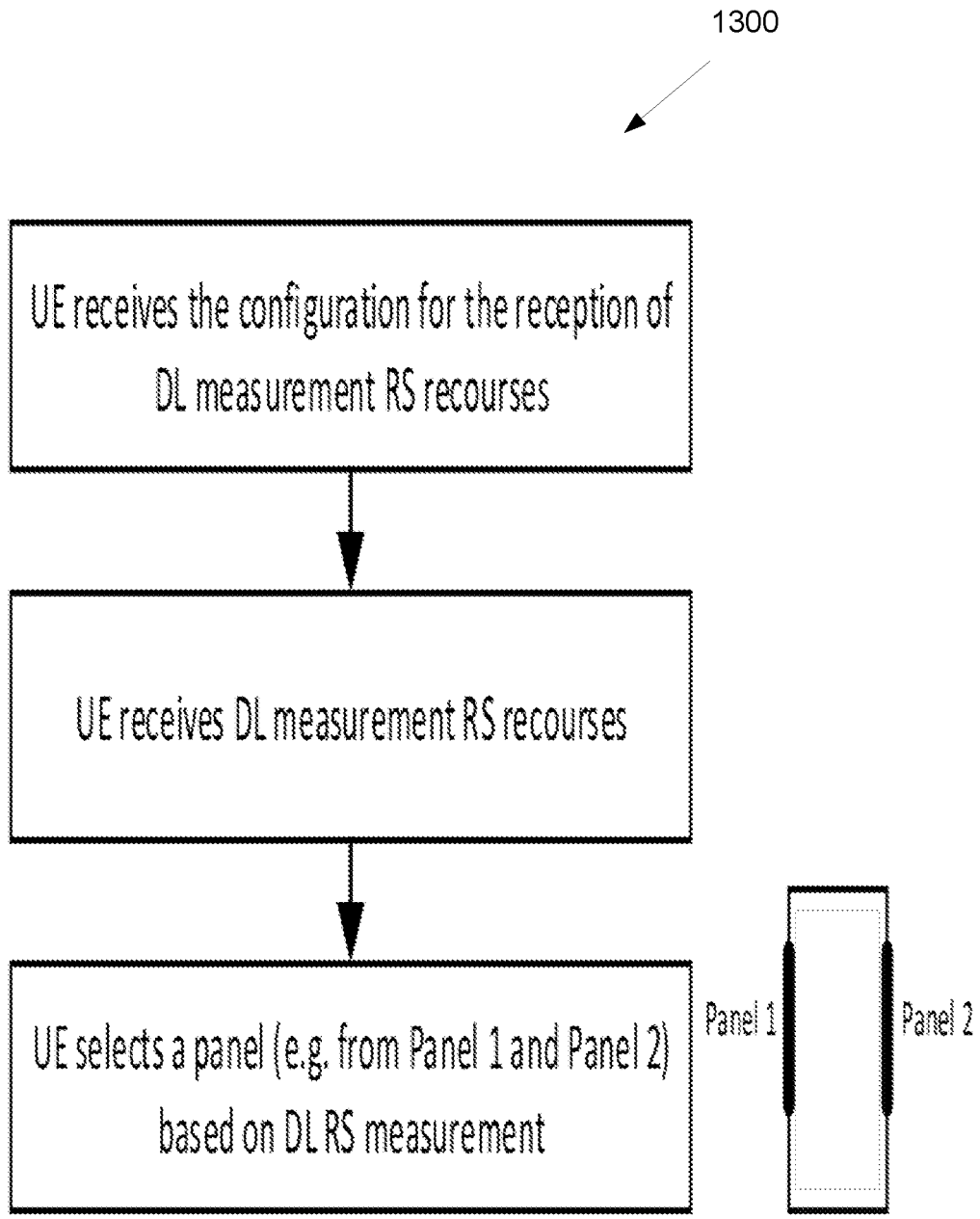
FIG. 13 illustrates a flow diagram illustrating UL antenna panel selection based on DL measurement RS resources according to embodiments of the present disclosure.

In one embodiment (I.1) illustrated in FIG. 13, a flow diagram illustrating UL antenna panel selection based on DL measurement RS resources 1300 is shown. The embodiment of the UL antenna panel selection based on DL measurement RS resources 1300 illustrated in FIG. 13 is for illustration only. FIG. 13 does not limit the scope of this disclosure to any particular implementation of the UL antenna panel selection based on DL measurement RS resources 1300.

As shown in FIG. 13, a UE equipped with X>1 antenna panels is configured to measure (receive) $P_1$ DL measurement RS resources (such as CSI-RS or SSB), where $P_1 \geq 1$. This configuration can be transmitted by the NW/gNB (received by the UE) via higher-layer (RRC) signaling. Optionally, the NW/gNB can signal/update the (sub)set of DL measurement RS resources dynamically via L1 or L2 DL control (PDCCH or MAC CE). These resources are used by the UE and/or the NW/gNB to perform beam measurement along different beams or spatial directions (represented by the beamforming/precoding operation), and potentially using different antenna panels at the UE. The time-domain behavior of the DL measurement RS resources can be configured as aperiodic (AP), semi-persistent (SP), or periodic (P). In one example, each of the $P_1$ DL measurement RS resources is a one port resource. In one example, each of the $P_1$ DL measurement RS resources is a one or two port resource. In one example, the DL measurement RS resources include the path-loss (PL) RS resources. In one example, the DL measurement RS resources include (NZP) CSI-RS resources. In one example, the DL measurement RS resources include both PL RS resources and (NZP) CSI-RS resources. In one example, the DL measurement RS resources include the SSB resources.

The UE is further configured to use the measurement (based on the received DL measurement RS resources) to select a panel out of X antenna panels, where the selected panel is used for the transmission of UL measurement RS resources (e.g., SRS, as described later in this disclosure) and/or UL channels (e.g., PUSCH). Since the panel selection is primarily based on the path loss factor, i.e., the UE can select a panel that minimizes the path loss, it does not depend on whether the DL-UL beam correspondence holds or not. Therefore, the panel selection can be based on the DL measurement RS resources. Note that while selecting a panel, a certain event of interest (such as MPE) can be considered by the UE (depending on the UE implementation).

In one example, the information about the panel selection (e.g., panel ID of the selected antenna panel) is not provided (reported) by the UE to the NW/gNB. In one example, the information about the panel selection (e.g., panel ID of the selected antenna panel) is provided (reported) by the UE to the NW/gNB. In one example, the reporting of such information can be configured, e.g., via RRC. When configured, the UE reports the information, otherwise, it does not. The information about panel selection (e.g., panel ID) may or may not be provided (reported) by the UE to the NW/gNB. When reported, the information can be included in a beam report.

In one example, the UE can be configured with the panel selection (as described above) only when the NW/gNB has the information (NW-aware) that X>1, i.e., the UE is not expected to be configured with the panel selection when X=1. In one example, the UE can be configured with the panel selection (as described above) regardless of the value of X, i.e., the NW/gNB can be unaware of the value of X. In one example, the UE can be configured with the panel selection (as described above) subject to the UE capability reported by the UE, i.e., only when the UE reports that it is capable of such panel selection.

In one example, the configuration about the panel selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (panel selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement'. In one example, the (panel selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'nonCodebook'. In one example, the (panel selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 > 1$ SRS resources (higher layer parameter SRS-Resource) with parameter usage set to 'beamManagement' and the higher layer parameter txConfig set to 'codebook'. In one example, these higher layer parameters are configured according to Rel. 15/16 NR specification.

In one example, the information about the association (linking) between DL RS resources (or resource set, e.g., CSI-RS-ResourceSet) and UL RS resources (or resource set, e.g., SRS-ResourceSet) can be provided (configured) via a higher layer parameter that can be included in the configuration for DL RS resource (or resource set, e.g., CSI-RS-ResourceSet) or in the configuration for UL RS resource (or resource set, e.g., SRS-ResourceSet) or in a separate configuration. In one example, the association (linking) between DL RS resources (or resource set) and UL RS resources (or resource set) is such that each DL RS resource is a reference or source RS for an UL RS resource (e.g., SRS resource) in the SRS resource set, wherein the reference or source RS is for a QCL type (e.g., QCL-Type D for spatial filter or beam in Rel. 15/16 NR).

In one example, the values of $P_1$ and $P_2$ have no relation (i.e., they are determined/configured independently). In one example, the values of $P_1$ and $P_2$ have some dependence, e.g., $P_1 = P_2$.

Selection of Y≥1 Panels

In one sub-embodiment (I.1.1), a UE equipped with X>1 antenna panels is configured to measure (receive) $P_1$ DL measurement RS resources (such as CSI-RS or SSB), where $P_1 \geq 1$, wherein the details about the DL RS measurement are described in embodiment I.1.

The UE is further configured to use the measurement (based on the received DL measurement RS resources) to select Y panels(s) out of X antenna panels, where the selected panel(s) is (are) used for the transmission of UL measurement RS resources (e.g., SRS, as described later in this disclosure) and/or UL channels (e.g., PUSCH). Note that while selecting Y panel(s), a certain event of interest (such as MPE) can be considered by the UE (depending on the UE implementation).

In one example, Y is fixed, e.g., Y=1. In one example, Y is configured, e.g., via RRC and/or MAC CE and/or DCI. In one example, Y is determined implicitly based on the value of X, e.g., Y=1 if X=2, and Y=2 if X=4. In one example, the value of Y is reported by the UE from a set, e.g., {1, . . . , X} or {1, 2}. In one example, Y depends on a UE capability and is reported by the UE. In one example, the network can configure/update Y taking into account the UE's capability.

In one example, the information about the panel selection (e.g., panel ID(s) of the selected antenna panel(s)) is not provided (reported) by the UE to the NW/gNB. In one example, the information about the panel selection (e.g., panel ID(s) of the selected antenna panel(s)) is provided (reported) by the UE to the NW/gNB. In one example, the reporting of such information can be configured, e.g., via RRC. When configured, the UE reports the information, otherwise, it does not. As explained in embodiment I.1, the information about panel selection (e.g., panel ID) may or may not be provided (reported) by the UE to the NW/gNB. When reported, the information can be included in a beam report.

In one example, the UE can be configured with the panel selection (as described above) only when the NW/gNB has the information (NW-aware) that X>1, i.e., the UE is not expected to be configured with the panel selection when X=1. In one example, the UE can be configured with the panel selection (as described above) regardless of the value of X, i.e., the NW/gNB can be unaware of the value of X. In one example, the UE can be configured with the panel selection (as described above) subject to the UE capability reported by the UE, i.e., only when the UE reports that it is capable of such panel selection.

In one example, the configuration about the panel selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (panel selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement'. In one example, the (panel selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'nonCodebook'. In one example, the (panel selection) configuration links (associates) the $P_1$ DL measurement RS resources (e.g., CSI-RS resources in a CSI-RS-ResourceSet) with one SRS resource set configured by the higher layer parameter SRS-Resource- Set comprising $P_2 \geq 1$ SRS resources (higher layer parameter SRS-Resource) with parameter usage set to 'beamManagement' and the higher layer parameter txConfig set to 'codebook'. In one example, these higher layer parameters are configured according to Rel. 15/16 NR specification.

In one sub-embodiment (I.1.2), a UE is configured to select one or $Y \geq 1$ antenna panels from X antenna panels, as described in embodiment I.1 and I.1.1, except that the X antenna panels correspond to "active" antenna panels that can be fewer (less) than the total number of antenna panels, say X', at the UE, i.e., $X \leq X'$. In one example, the information about X, X', and the set (or IDs) of active antenna panels can be provided (reported) by the UE to the NW/gNB. In one example, the information about X (but not X' and the set of active antenna panels) can be provided (reported) by the UE to the NW/gNB. In one example, the information about X can be provided (reported) by the UE to the NW/gNB, and the information about X' and/or the set of active antenna panels is configured to the UE, e.g., via RRC and/or MAC CE. In one example, the maximum number of active antenna panels depends on a UE capability. In one example, the network can configure/update the number of active panels taking into account the UE's capability.

In one example, when Y=1, and the UE selects one panel from X active panels, then such a selection is referred to as 'panel selection', and when Y>1, and the UE selects multiple panels from the total of X' panels, then such a selection is referred to as 'panel activation.' Note that in this example, the panel selection is from active panels, which in turn are selected/activated (panel activation) from all available panels. In one example, the panel activation determines a set of candidate panels for downlink (DL) reception or uplink (UL) transmission, and the panel selection determines the panels actually used for DL reception or UL transmission.

In one example, when a panel corresponds to a Tx-Rx entity, and when Y=1, and the UE selects one Tx-Rx entity from X active (or activated) Tx-Rx entities, then such a selection is referred to as 'entity selection', and when Y>1, and the UE selects multiple Tx-Rx entities from the total of X' Tx-Rx entities, then such a selection is referred to as 'entity activation.' Note that in this example, the entity selection is from active (or activated) Tx-Rx entities, which in turn are selected/activated (entity activation) from all available Tx-Rx entities. In one example, the entity activation determines a set of candidate Tx-Rx entities for downlink (DL) reception or uplink (UL) transmission, and the entity selection determines the Tx-Rx entities actually used for DL reception or UL transmission.

In the rest of the disclosure, the term panel or antenna panel is used, which is functionally equivalent to a Tx-Rx entity.

In one sub-embodiment (I.1.3), when the UE is configured to receive DL measurement RS resources through/from E>1 entities, such as antenna panels or TRPs or component carriers (CCs) or different spatial filters or beams or ports, then the set of $P_1$ DL measurement RS resources can be partitioned into E subsets, and the e-th subset includes $M_e$ DL measurement RS resources such that $P_1 = \Sigma_{e=1}^{E} M_e$. The information about E subsets can be provided (configured) via the configuration configuring the $P_1$ DL measurement RS resources.

In one sub-embodiment (I.1.4), when the UE is configured to receive DL measurement RS resources from E>1 entities, such as antenna panels or TRPs or component carriers (CCs) or different spatial filters or beams or ports, then the $P_1$ DL measurement RS resources belong to a super-set encompassing E sets, and the e-th set includes $M_e$ DL measurement RS resources such that $P_1 = \Sigma_{e=1}^{E} M_e$. The information about E sets can be provided (configured) via the configuration configuring the $P_1$ DL measurement RS resources.

Figure 14:
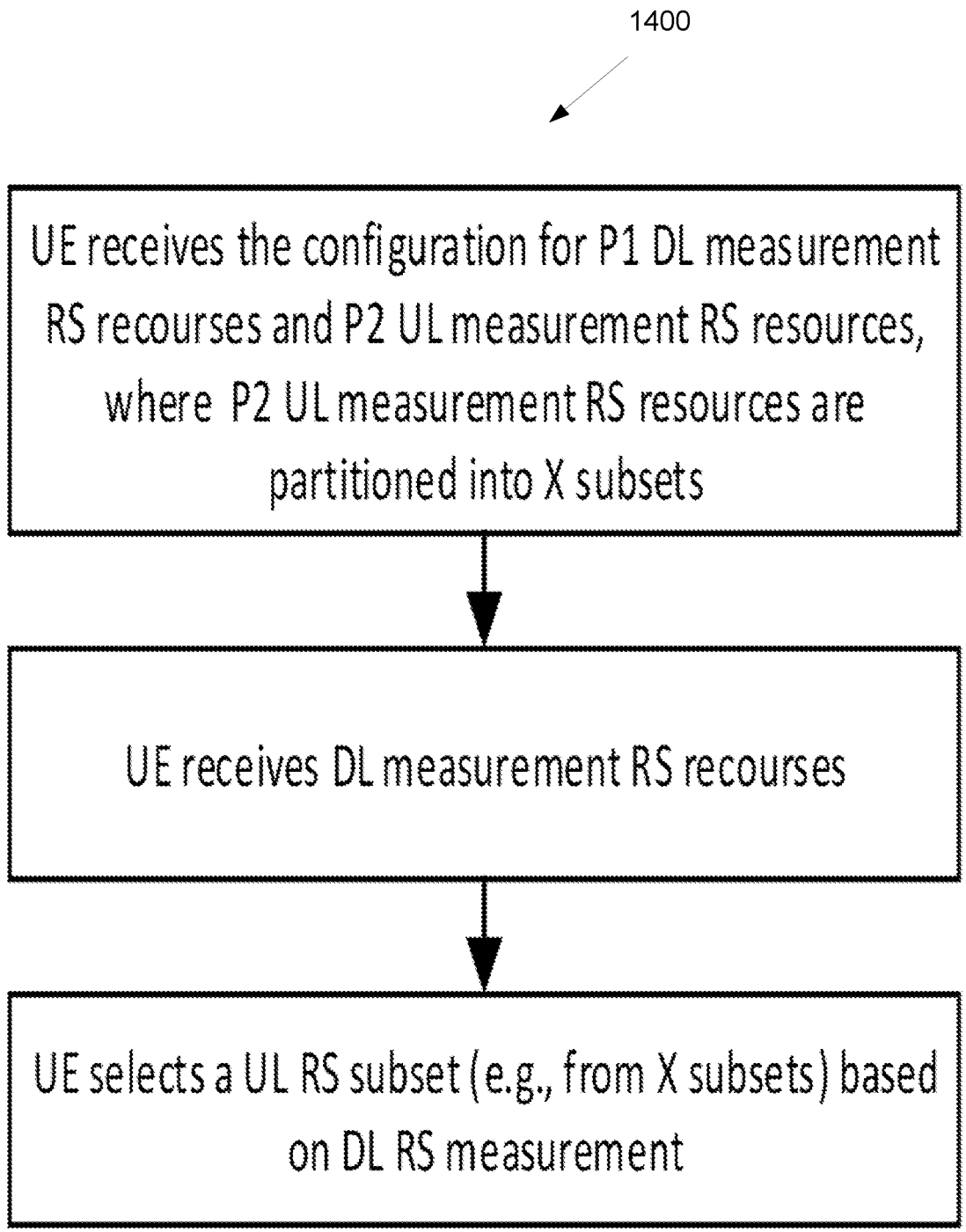
FIG. 14 illustrates a flow diagram illustrating UL antenna panel selection based on DL measurement RS resources according to embodiments of the present disclosure.

In one embodiment (I.2) illustrated in FIG. 14, a flow diagram illustrating UL antenna panel selection based on DL measurement RS resources 1400 is shown. The embodiment of the UL antenna panel selection based on DL measurement RS resources 1400 illustrated in FIG. 14 is for illustration only. FIG. 14 does not limit the scope of this disclosure to any particular implementation of the UL antenna panel selection based on DL measurement RS resources 1400.

As shown in FIG. 14, a UE is configured to measure (receive) $P_1$ DL measurement RS resources (such as CSI-RS or SSB), where $P_1 \geq 1$. This configuration can be transmitted by the NW/gNB (received by the UE) via higher-layer (RRC) signaling. Optionally, the NW/gNB can signal/update the (sub)set of DL measurement RS resources dynamically via L1 or L2 DL control (PDCCH or MAC CE). These resources are used by the UE and/or the NW/gNB to perform beam measurement along different beams or spatial directions (represented by the beamforming/precoding operation), and potentially using different antenna panels at the UE. The time-domain behavior of the DL measurement RS resources can be configured as aperiodic (AP), semi-persistent (SP), or periodic (P). In one example, each of the $P_1$ DL measurement RS resources is a one port resource. In one example, each of the $P_1$ DL measurement RS resources is a one or two port resource. In one example, the DL measurement RS resources include the path-loss (PL) RS resources. In one example, the DL measurement RS resources include (NZP) CSI-RS resources. In one example, the DL measurement RS resources include both PL RS resources and (NZP) CSI-RS resources. In one example, the DL measurement RS resources include the SSB resources.

The UE also receives a configuration (either jointly or separately from the configuration for the DL RS resources) for $P_2$ UL measurement RS resources (such as SRS), wherein the set of $P_2$ UL measurement RS resources can be partitioned into X subsets, and the x-th subset includes $M_x$ UL measurement RS resources such that $P_2 = \Sigma_{x=1}^{X} M_x$. The information about X subsets can be provided (configured) via the configuration configuring the $P_2$ UL measurement RS resources. In one example, $P_2 = X$ and hence $M_x = 1$, i.e., each subset comprises a single resource. In one example, $P_2 > X$ and hence $M_x > 1$ for at least one subset. In one example, $$M_x = \frac{P_2}{X}.$$

In one example, a subset can be associated one-on-one with an antenna panel at the UE. In one example, a subset can be associated with a range of angles (or a set of spatial filters) at the UE. The information about the association may or may not be available at the NW/gNB.

In one example, such a configuration (including the subsets) of the $P_2$ UL measurement RS resources can be configured only when the UE is equipped with multiple (e.g., X) antenna panels. In one example, such a configuration (including the subsets) of the $P_2$ UL measurement RS resources can be configured regardless of the number of antenna panels at the UE.

The UE is further configured to use the measurement (based on the received DL measurement RS resources) to select a UL subset out of X subsets of UL RS resources, where the selected subset is used for the transmission of UL measurement RS resources (e.g., SRS, as described later in this disclosure) and/or UL channels (e.g., PUSCH). Since the subset selection is primarily based on the path loss factor, i.e., the UE can select a subset that minimizes the path loss, it does not depend on whether the DL-UL beam correspondence holds or not. Therefore, the subset selection can be based on the DL measurement RS resources. Note that while selecting a subset, a certain event of interest (such as MPE) can be considered by the UE (depending on the UE implementation). Note that when $P_2=X$, i.e., $M_x=1$, the subset selection is equivalent to resource selection (i.e., selecting one out of $P_2$ UL RS resources).

In one example, the information about the subset selection (e.g., subset ID of the selected subset) is not provided (reported) by the UE to the NW/gNB. In one example, the information about the subset selection (e.g., subset ID of the selected subset) is provided (reported) by the UE to the NW/gNB. In one example, the reporting of such information can be configured, e.g., via RRC. When configured, the UE reports the information, otherwise, it does not. The information about subset selection (e.g., subset ID) may or may not be provided (reported) by the UE to the NW/gNB. When reported, the information can be included in a beam report.

In one example, the UE can be configured with the subset selection (as described above) only when the NW/gNB has the information (NW-aware) that $X>1$, i.e., the UE is not expected to be configured with the subset selection when $X=1$. In one example, the UE can be configured with the subset selection (as described above) regardless of the value of X, i.e., the NW/gNB can be unaware of the value of X. In one example, the UE can be configured with the subset selection (as described above) subject to the UE capability reported by the UE, i.e., only when the UE reports that it is capable of such subset selection.

In one example, the configuration about the subset selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement'. In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'nonCodebook'. In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'codebook'. In one example, these higher layer parameters are configured according to Rel. 15/16 NR specification. As described, the set of $P_2$ SRS resources can be partitioned into X subsets.

Selection of $Y \geq 1$ Subsets

In one sub-embodiment (I.2.1), a UE is configured to measure (receive) $P_1$ DL measurement RS resources (such as CSI-RS or SSB), where $P_1 \geq 1$ and the set of $P_1$ DL measurement RS resources can be partitioned into X subsets, wherein the details about the DL RS measurement, and X subsets are described in embodiment I.2.

The UE also receives a configuration (either jointly or separately from the configuration for the DL RS resources) for $P_2$ UL measurement RS resources (such as SRS), wherein the set of $P_2$ UL measurement RS resources can be partitioned into X subsets, and the x-th subset includes $M_x$ UL measurement RS resources such that $P_2 = \Sigma_{x=1}^{X} M_x$. The information about X subsets can be provided (configured) via the configuration configuring the $P_2$ UL measurement RS resources. In one example, $P_2=X$ and hence $M_x=1$, i.e., each subset comprises a single resource. In one example, $P_2>X$ and hence $M_x>1$ for at least one subset. In one example, $$M_x = \frac{P_2}{X}.$$

The UE is further configured to use the measurement (based on the received DL measurement RS resources) to select Y UL subset(s) out of X subsets, where the selected subset(s) is (are) used for the transmission of UL measurement RS resources (e.g., SRS, as described later in this disclosure) and/or UL channels (e.g., PUSCH). Note that while selecting Y subset(s), a certain event of interest (such as MPE) can be considered by the UE (depending on the UE implementation). Note that when $P_2=X$, i.e., $M_x=1$, the Y subset selection is equivalent to Y resource selection (i.e., selecting one out of $P_2$ UL RS resources).

In one example, Y is fixed, e.g., Y=1. In one example, Y is configured, e.g., via RRC and/or MAC CE and/or DCI. In one example, Y is determined implicitly based on the value of X, e.g., Y=1 if X=2, and Y=2 if X=4. In one example, the value of Y is reported by the UE from a set, e.g., {1, . . . , X} or {1, 2}. In one example, Y depends on a UE capability and is reported by the UE. In one example, the network can configure/update Y taking into account the UE's capability.

In one example, the information about the subset selection (e.g., subset ID(s) of the selected subset(s)) is not provided (reported) by the UE to the NW/gNB. In one example, the information about the subset selection (e.g., subset ID(s) of the selected subset(s)) is provided (reported) by the UE to the NW/gNB. In one example, the reporting of such information can be configured, e.g., via RRC. When configured, the UE reports the information, otherwise, it does not. As explained in embodiment I.2, the information about subset selection (e.g., subset ID) may or may not be provided (reported) by the UE to the NW/gNB. When reported, the information can be included in a beam report.

In one example, the UE can be configured with the subset selection (as described above) only when the NW/gNB has the information (NW-aware) that the UE is equipped with more than antenna panels, i.e., the UE is not expected to be configured with the subset selection when the UE is equipped with one antenna panel. In one example, the UE can be configured with the subset selection (as described above) regardless of the number of antenna panels at the UE, i.e., the NW/gNB can be unaware of the value of number of antenna panels at the UE. In one example, the UE can be configured with the subset selection (as described above)

subject to the UE capability reported by the UE, i.e., only when the UE reports that it is capable of such subset selection.

In one example, the configuration about the subset selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement'. In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'nonCodebook'. In one example, the (subset selection) configuration links (associates) the $P_1$ DL measurement RS resources (e.g., CSI-RS resources in a CSI-RS-ResourceSet) with one SRS resource set configured by the higher layer parameter SRS-ResourceSet comprising $P_2 \geq 1$ SRS resources (higher layer parameter SRS-Resource) with parameter usage set to 'beamManagement' and the higher layer parameter txConfig set to 'codebook'. In one example, these higher layer parameters are configured according to Rel. 15/16 NR specification. As described, the set of $P_2$ SRS resources can be partitioned into X subsets.

In one sub-embodiment (I.2.2), a UE is configured to select one or $Y \geq 1$ RS subsets from X RS subsets, as described in embodiment I.2 and I.2.1, except that the X RS subsets correspond to "active" RS subsets that can be fewer (less) than the total number of RS subsets, say X', i.e., $X \leq X'$. In one example, the information about X, X', and the set (or IDs) of active RS subsets can be provided (reported) by the UE to the NW/gNB. In one example, the information about X (but not X' and the set of active RS subsets) can be provided (reported) by the UE to the NW/gNB. In one example, the information about X can be provided (reported) by the UE to the NW/gNB, and the information about X' and/or the set of active RS subsets is configured to the UE, e.g., via RRC and/or MAC CE. In one example, the maximum number of active RS subsets depends on a UE capability. In one example, the network can configure/update the number of active RS subsets taking into account the UE's capability.

In one example, when Y=1, and the UE selects one RS subset from X active RS subsets, then such a selection is referred to as 'RS subset selection', and when Y>1, and the UE selects multiple RS subsets from the total of X' RS subsets, then such a selection is referred to as 'RS subset activation.' Note that in this example, the RS subset selection is from active RS subsets, which in turn are selected/activated (RS subset activation) from all available RS subsets. In one example, the RS subset activation determines a set of candidate RS subsets for downlink (DL) reception or uplink (UL) transmission, and the RS subset selection determines the RS subsets actually used for DL reception or UL transmission.

In one example, when an RS subset corresponds to a Tx-Rx entity, and when Y=1, and the UE selects one Tx-Rx entity from X active (or activated) Tx-Rx entities, then such a selection is referred to as 'entity selection', and when Y>1, and the UE selects multiple Tx-Rx entities from the total of X' Tx-Rx entities, then such a selection is referred to as 'entity activation.' Note that in this example, the entity selection is from active (or activated) Tx-Rx entities, which in turn are selected/activated (entity activation) from all available Tx-Rx entities. In one example, the entity activation determines a set of candidate Tx-Rx entities for downlink (DL) reception or uplink (UL) transmission, and the entity selection determines the Tx-Rx entities actually used for DL reception or UL transmission.

In the rest of the disclosure, the term RS subset is functionally equivalent to a Tx-Rx entity.

In one sub-embodiment (I.2.3), when the UE is configured to receive DL measurement RS resources through/from E>1 entities, such as antenna panels or TRPs or component carriers (CCs) or different spatial filters or beams or ports, then the set of $P_1$ DL measurement RS resources can be partitioned into E subsets, and the e-th subset includes $M_e$ DL measurement RS resources such that $P_1 = \Sigma_{e=1}^{E} M_e$. The information about E subsets can be provided (configured) via the configuration configuring the $P_1$ DL measurement RS resources.

In one sub-embodiment (I.2.4), when the UE is configured to receive DL measurement RS resources from E>1 entities, such as antenna panels or TRPs or component carriers (CCs) or different spatial filters or beams or ports, then the $P_1$ DL measurement RS resources belong to a super-set encompassing E sets, and the e-th set includes $M_e$ DL measurement RS resources such that $P_1 = \Sigma_{e=1}^{E} M_e$. The information about E sets can be provided (configured) via the configuration configuring the $P_1$ DL measurement RS resources.

Figure 15:
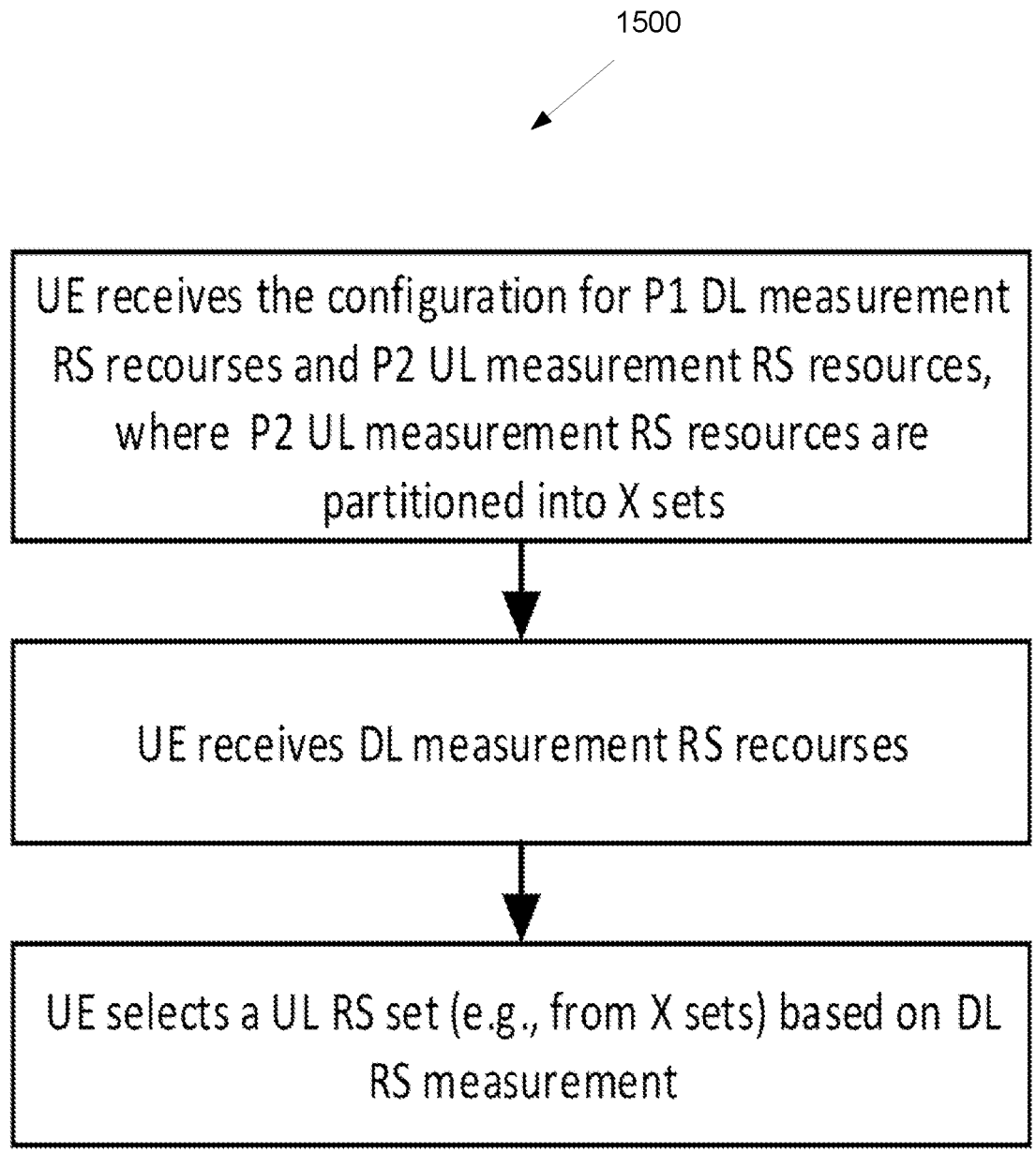
FIG. 15 illustrates a flow diagram illustrating UL antenna panel selection based on DL measurement RS resources according to embodiments of the present disclosure.

In one embodiment (I.3) illustrated in FIG. 15, a flow diagram illustrating UL antenna panel selection based on DL measurement RS resources 1500 is shown. The embodiment of the UL antenna panel selection based on DL measurement RS resources 1500 illustrated in FIG. 15 is for illustration only. FIG. 15 does not limit the scope of this disclosure to any particular implementation of the UL antenna panel selection based on DL measurement RS resources 1500.

As shown in FIG. 15, a UE is configured to measure (receive) $P_1$ DL measurement RS resources (such as CSI-RS or SSB), where $P_1 \geq 1$. This configuration can be transmitted by the NW/gNB (received by the UE) via higher-layer (RRC) signaling. Optionally, the NW/gNB can signal/update the (sub)set of DL measurement RS resources dynamically via L1 or L2 DL control (PDCCH or MAC CE). These resources are used by the UE and/or the NW/gNB to perform beam measurement along different beams or spatial directions (represented by the beamforming/precoding operation), and potentially using different antenna panels at the UE. The time-domain behavior of the DL measurement RS resources can be configured as aperiodic (AP), semi-persistent (SP), or periodic (P). In one example, each of the $P_1$ DL measurement RS resources is a one port resource. In one example, each of the $P_1$ DL measurement RS resources is a one or two port resource. In one example, the DL measurement RS resources include the path-loss (PL) RS resources. In one example, the DL measurement RS resources include (NZP) CSI-RS resources. In one example, the DL measurement RS resources include both PL RS resources and (NZP) CSI-RS resources. In one example, the DL measurement RS resources include the SSB resources.

The UE also receives a configuration (either jointly or separately from the configuration for the DL RS resources) for $P_2$ UL measurement RS resources (such as SRS), wherein the $P_2$ UL measurement RS resources belong to a super-set encompassing X sets, and the x-th set includes $M_x$ UL measurement RS resources such that $P_1=\Sigma_{x=1}^{X}M_x$. The information about X sets can be provided (configured) via the configuration configuring the $P_1$ DL measurement RS resources. In one example, $P_2=X$ and hence $M_x=1$, i.e., each set comprises a single resource. In one example, $P_2>X$ and hence $M_x>1$ for at least one set. In one example, $$M_x = \frac{P_2}{X}.$$

In one example, a set can be associated one-on-one with an antenna panel at the UE. In one example, a set can be associated a range of angles (or a set of spatial filters) at the UE. The information about the association may or may not be available at the NW/gNB.

In one example, such a configuration (including the sets) of the $P_2$ UL measurement RS resources can be configured only when the UE is equipped with multiple (e.g., X) antenna panels. In one example, such a configuration (including the sets) of the $P_2$ UL measurement RS resources can be configured regardless of the number of antenna panels at the UE.

The UE is further configured to use the measurement (based on the received DL measurement RS resources) to select a UL set out of X sets of UL RS resources, where the selected set is used for the transmission of UL measurement RS resources (e.g., SRS, as described later in this disclosure) and/or UL channels (e.g., PUSCH). Since the set selection is primarily based on the path loss factor, i.e., the UE can select a set that minimizes the path loss, it does not depend on whether the DL-UL beam correspondence holds or not. Therefore, the set selection can be based on the DL measurement RS resources. Note that while selecting a set, a certain event of interest (such as MPE) can be considered by the UE (depending on the UE implementation). Note that when $P_2=X$, i.e., $M_x=1$, the set selection is equivalent to resource selection (i.e., selecting one out of $P_2$ UL RS resources).

In one example, the information about the set selection (e.g., set ID of the selected set) is not provided (reported) by the UE to the NW/gNB. In one example, the information about the set selection (e.g., set ID of the selected set) is provided (reported) by the UE to the NW/gNB. In one example, the reporting of such information can be configured, e.g., via RRC. When configured, the UE reports the information, otherwise, it does not. The information about set selection (e.g., set ID) may or may not be provided (reported) by the UE to the NW/gNB. When reported, the information can be included in a beam report.

In one example, the UE can be configured with the set selection (as described above) only when the NW/gNB has the information (NW-aware) that X>1, i.e., the UE is not expected to be configured with the set selection when X=1. In one example, the UE can be configured with the set selection (as described above) regardless of the value of X, i.e., the NW/gNB can be unaware of the value of X. In one example, the UE can be configured with the set selection (as described above) subject to the UE capability reported by the UE, i.e., only when the UE reports that it is capable of such set selection.

In one example, the configuration about the set selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement'. In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement' and the higher layer parameter txConfig set to 'nonCodebook'. In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement' and the higher layer parameter txConfig set to 'codebook'. In one example, these higher layer parameters are configured according to Rel. 15/16 NR specification. As described, the set of $P_2$ SRS resources can be partitioned into X sets.

Selection of Y>1 Sets

In one sub-embodiment (I.3.1), a UE is configured to measure (receive) $P_1$ DL measurement RS resources (such as CSI-RS or SSB), where $P_1 \geq 1$ and the set of $P_1$ DL measurement RS resources can be partitioned into X sets, wherein the details about the DL RS measurement, and X sets are described in embodiment I.3.

The UE also receives a configuration (either jointly or separately from the configuration for the DL RS resources) for $P_2$ UL measurement RS resources (such as SRS), wherein the $P_2$ UL measurement RS resources belong to a super-set encompassing X sets, and the x-th set includes $M_x$ UL measurement RS resources such that $P_1=\Sigma_{x=1}^{X}M_x$. The information about X sets can be provided (configured) via the configuration configuring the $P_1$ DL measurement RS resources. In one example, $P_2=X$ and hence $M_x=1$, i.e., each set comprises a single resource. In one example, $P_2>X$ and hence $M_x>1$ for at least one set. In one example, $$M_x = \frac{P_2}{X}.$$

The UE is further configured to use the measurement (based on the received DL measurement RS resources) to select Y UL set(s) out of X sets, where the selected set(s) is (are) used for the transmission of UL measurement RS resources (e.g., SRS, as described later in this disclosure) and/or UL channels (e.g., PUSCH). Note that while selecting Y set(s), a certain event of interest (such as MPE) can be considered by the UE (depending on the UE implementation). Note that when $P_2=X$, i.e., $M_x=1$, the Y set selection is equivalent to Y resource selection (i.e., selecting one out of $P_2$ UL RS resources).

In one example, Y is fixed, e.g., Y=1. In one example, Y is configured, e.g., via RRC and/or MAC CE and/or DCI. In one example, Y is determined implicitly based on the value of X, e.g., Y=1 if X=2, and Y=2 if X=4. In one example, the value of Y is reported by the UE from a set, e.g., {1, . . . , X} or {1, 2}. In one example, Y depends on a UE capability and is reported by the UE. In one example, the network can configure/update Y taking into account the UE's capability.

In one example, the information about the set selection (e.g., set ID(s) of the selected set(s)) is not provided (reported) by the UE to the NW/gNB. In one example, the information about the set selection (e.g., set ID(s) of the selected set(s)) is provided (reported) by the UE to the NW/gNB. In one example, the reporting of such information can be configured, e.g., via RRC. When configured, the UE reports the information, otherwise, it does not. As explained in embodiment I.3, the information about set selection (e.g., set ID) may or may not be provided (reported) by the UE to the NW/gNB. When reported, the information can be included in a beam report.

In one example, the UE can be configured with the set selection (as described above) only when the NW/gNB has the information (NW-aware) that the UE is equipped with more than antenna panels, i.e., the UE is not expected to be configured with the set selection when the UE is equipped with one antenna panel. In one example, the UE can be configured with the set selection (as described above) regardless of the number of antenna panels at the UE, i.e., the NW/gNB can be unaware of the value of number of antenna panels at the UE. In one example, the UE can be configured with the set selection (as described above) subject to the UE capability reported by the UE, i.e., only when the UE reports that it is capable of such set selection.

In one example, the configuration about the set selection can be via higher layer (RRC) signaling. In one example, this configuration is via RRC and MAC CE (e.g., based on SP CSI-RS). In one example, this configuration is via RRC and DCI (e.g., based on AP CSI-RS).

In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement'. In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement' and the higher layer parameter txConfig set to 'nonCodebook'. In one example, the (set selection) configuration links (associates) the $P_1$ DL measurement RS resources (e.g., CSI-RS resources in a CSI-RS-ResourceSet) with X SRS resource sets configured by the higher layer parameter SRS-ResourceSet comprising $P_2 \geq 1$ SRS resources in total (higher layer parameter SRS-Resource) with parameter usage set to 'beamManagement' and the higher layer parameter txConfig set to 'codebook'. In one example, these higher layer parameters are configured according to Rel. 15/16 NR specification. As described, the set of $P_2$ SRS resources can be partitioned into X sets.

In one sub-embodiment (I.3.2), a UE is configured to select one or $Y \geq 1$ RS sets from X RS sets, as described in embodiment I.2 and I.2.1, except that the X RS sets correspond to "active" RS sets that can be fewer (less) than the total number of RS sets, say X', i.e., $X \leq X'$. In one example, the information about X, X', and the set (or IDs) of active RS sets can be provided (reported) by the UE to the NW/gNB. In one example, the information about X (but not X' and the set of active RS sets) can be provided (reported) by the UE to the NW/gNB. In one example, the information about X can be provided (reported) by the UE to the NW/gNB, and the information about X' and/or the set of active RS sets is configured to the UE, e.g., via RRC and/or MAC CE. In one example, the maximum number of active antenna RS sets depends on a UE capability. In one example, the network can configure/update the number of active RS sets taking into account the UE's capability.

In one example, when Y=1, and the UE selects one RS set from X active sets, then such a selection is referred to as 'RS set selection', and when Y>1, and the UE selects multiple RS sets from the total of X' RS sets, then such a selection is referred to as 'RS set activation.' Note that in this example, the RS set selection is from active RS sets, which in turn are selected/activated (RS set activation) from all available RS sets. In one example, the RS set activation determines a set of candidate RS sets for downlink (DL) reception or uplink (UL) transmission, and the RS set selection determines the RS sets actually used for DL reception or UL transmission.

In one example, when an RS set corresponds to a Tx-Rx entity, and when Y=1, and the UE selects one Tx-Rx entity from X active (or activated) Tx-Rx entities, then such a selection is referred to as 'entity selection', and when Y>1, and the UE selects multiple Tx-Rx entities from the total of X' Tx-Rx entities, then such a selection is referred to as 'entity activation.' Note that in this example, the entity selection is from active (or activated) Tx-Rx entities, which in turn are selected/activated (entity activation) from all available Tx-Rx entities. In one example, the entity activation determines a set of candidate Tx-Rx entities for downlink (DL) reception or uplink (UL) transmission, and the entity selection determines the Tx-Rx entities actually used for DL reception or UL transmission.

In the rest of the disclosure, the term RS set is functionally equivalent to a Tx-Rx entity.

In one sub-embodiment (I.3.3), when the UE is configured to receive DL measurement RS resources through/from E>1 entities, such as antenna panels or TRPs or component carriers (CCs) or different spatial filters or beams or ports, then the set of $P_1$ DL measurement RS resources can be partitioned into E subsets, and the e-th subset includes $M_e$ DL measurement RS resources such that $P_1 = \Sigma_{e=1}^{E} M_e$. The information about E subsets can be provided (configured) via the configuration configuring the $P_1$ DL measurement RS resources.

In one sub-embodiment (I.3.4), when the UE is configured to receive DL measurement RS resources from E>1 entities, such as antenna panels or TRPs or component carriers (CCs) or different spatial filters or beams or ports, then the $P_1$ DL measurement RS resources belong to a super-set encompassing E sets, and the e-th set includes $M_e$ DL measurement RS resources such that $P_1 = \Sigma_{e=1}^{E} M_e$. The information about E sets can be provided (configured) via the configuration configuring the $P_1$ DL measurement RS resources.

In one embodiment (I.4), a UE is configured to measure (receive) $P_1$ DL measurement RS resources (such as CSI-RS or SSB), where $P_1 \geq 1$ and the details about the DL RS measurement are described in embodiment I.1, I.2, or I.3. The UE is further configured to use the DL RS measurements to detect an event of interest (such as MPE) instead of selecting panel(s) or UL RS subset(s) or UL RS set(s). The UE can optionally report a message (e.g., via beam report) regarding the detection of the event of interest. The UE is further configured to transmit $P_2$ UL measurement RS resources (such as SRS), where $P_2 \geq 1$ and the details about the UL RS resources are described in embodiment I.1, I.2, or I.3. In this case, the UE transmits UL RS for all or a subset of panels or UL RS subsets or UL RS sets.

Component 2—UE Procedures for UL TX Beam Selection

In the second component, example embodiments for the UL TX beam selection are provided for the case when beam correspondence between DL and UL may or may hold (i.e., regardless of the beam correspondence), wherein the selection/indication of the UL TX beam for UL transmission is based on both DL and UL RS measurement.

Figure 16:
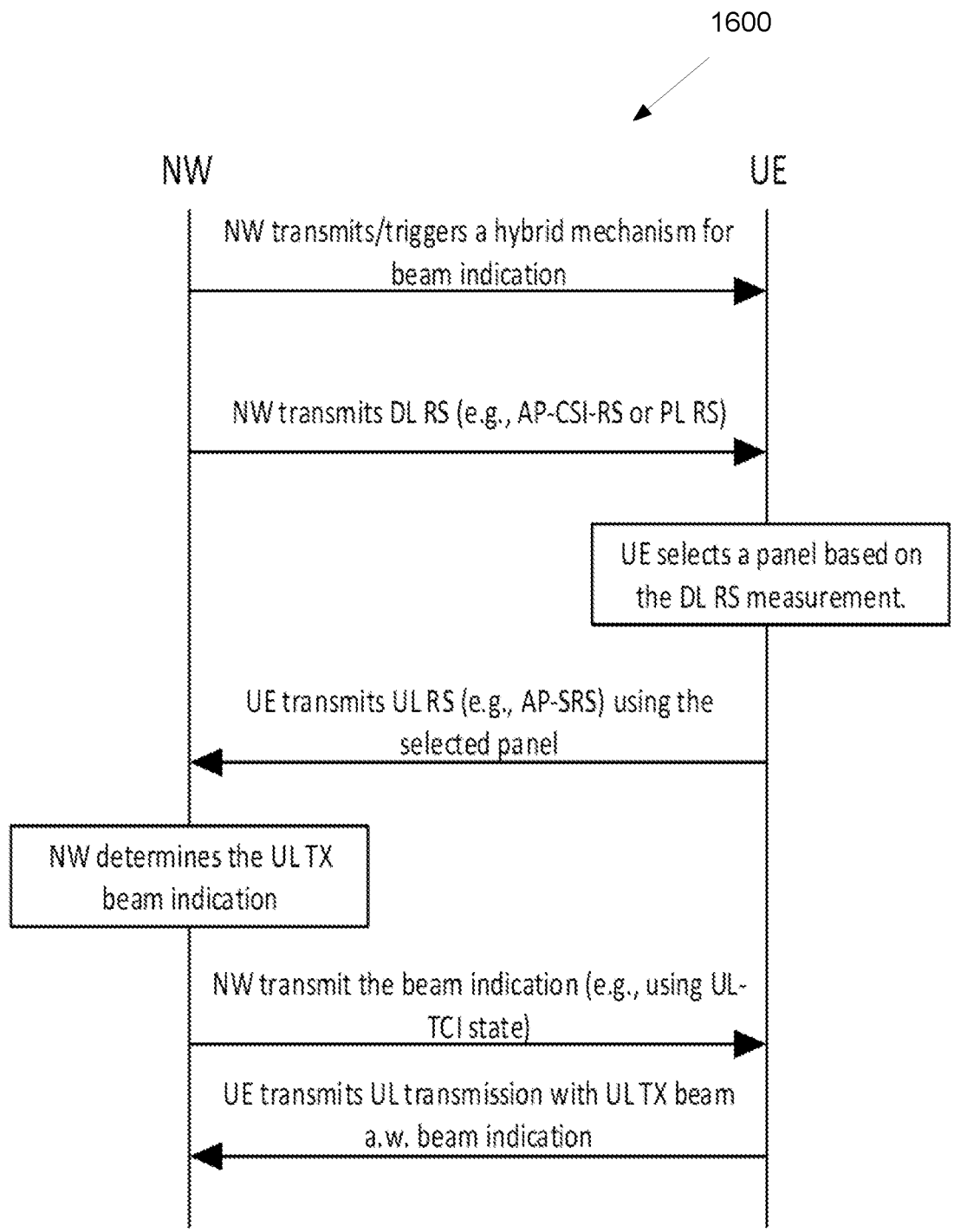
FIG. 16 illustrates a flow diagram illustrating UL TX beam selection according to embodiments of the present disclosure.

In one embodiment (II.1) illustrated in FIG. 16, a flow diagram illustrating UL TX beam selection 1600 is shown. The embodiment of the UL TX beam selection 1600 illustrated in FIG. 16 is for illustration only. FIG. 16 does not limit the scope of this disclosure to any particular implementation of the UL TX beam selection 1600.

As shown in FIG. 16, a UE is configured with a "hybrid UL TX beam selection mechanism" for a UE equipped with X>1 antenna panels, wherein the UE is configured to measure (receive) $P_1$ DL measurement RS resources (such as CSI-RS or SSB or PL RS), and use the measurement (based on the received DL measurement RS resources) to select one panel out of X antenna panels where the details about the DL RS measurement resources and their reception, and the panel selection are described in embodiment I.1 and/or sub-embodiments (I.1.1 through I.1.4) therein.

The UE also receives a configuration (either jointly or separately from the configuration for the DL RS resources) for $P_2$ UL measurement RS resources (such as SRS). The UE transmits the $P_2$ UL measurement RS resources using (from) the selected panel. Note that the number of transmission instances of the UL measurement RS resources is reduced when compared with the transmission from all panels, which help reduce the latency associated with the UL RS measurement. As explained in embodiment I.1, the information about panel selection (e.g., panel ID) may or may not be provided (reported) by the UE to the NW/gNB. When reported, the information can be included in a beam report.

In one example, the linking (association) between the $P_1$ DL measurement RS resources (e.g., CSI-RS resources in a CSI-RS-ResourceSet) and $P_2$ UL measurement RS resources (e.g., SRS resources in a SRS-ResourceSet) are as described in embodiment I.1.

In one example, the panel selection is based on periodic or semi-persistent DL RS measurements, where the periodicity (or periodicityAndOffset) of this panel selection can be fixed or configured, e.g., via RRC. The UE transmits the UL measurement RS resources using the panel selected based on the latest periodic DL RS measurements. In one example, the panel selection is based on aperiodic DL RS measurements, e.g., triggered via DCI. The UE transmits the UL measurement RS resources using the panel selected based on the latest aperiodic DL RS measurements. In one example, the panel selection is based on a SP DL RS measurements, e.g., activated via a MAC CE command. The UE transmits the UL measurement RS resources using the panel selected based on the latest SP DL RS measurements. Note that time domain behavior (AP, P, or SP) of the UL measurement RS resources may or may not be the same as that of the DL measurement RS resources.

The NW/gNB measures (receives) the UL measurement RS resources, and determines/transmits a UL TX beam indication to the UE for UL transmission, where the beam indication indicates N≥1 UL TX beam(s). The beam indication can be via UL-TCI or other functionally equivalent entity such as SpatialRelationInfo or SRI that is indicated via DCI and/or MAC CE and/or RRC. In one example N=1. In one example, N=2.

The UE receives the beam indication, and transmits UL transmission (e.g., PUSCH) using a UL TX beam associated with (a.w.) the beam indication.

Selection of Y≥1 Panels

In one sub-embodiment (II.1.1), a UE is configured with a "hybrid UL TX beam selection mechanism" for a UE equipped with X>1 antenna panels, wherein the UE is configured to measure (receive) $P_1$ DL measurement RS resources (such as CSI-RS or SSB or PL RS), and use the measurement (based on the received DL measurement RS resources) to select Y panels(s) out of X antenna panels where the details about the DL RS measurement resources and their reception, and the panel selection are described in sub-embodiment I.1.1. The UE also receives a configuration (either jointly or separately from the configuration for the DL RS resources) for $P_2$ UL measurement RS resources (such as SRS). The UE transmits the $P_2$ UL measurement RS resources using (from) the selected Y panel(s). The rest of the details (such as beam indication) are as described in embodiment II.1.

In one sub-embodiment (II.1.2), a UE is configured to select one or Y≥1 antenna panels from X antenna panels, as described in embodiment I.1.2.

In one sub-embodiment (II.1.3), a UE is configured to receive DL measurement RS resources through/from E>1 entities, where the set of $P_1$ DL measurement RS resources can be partitioned into E subsets, as described in embodiment I.1.3.

In one sub-embodiment (II.1.4), a UE is configured to receive DL measurement RS resources through/from E>1 entities, where the set of $P_1$ DL measurement RS resources can be partitioned into E sets, as described in embodiment I.1.4.

Figure 17:
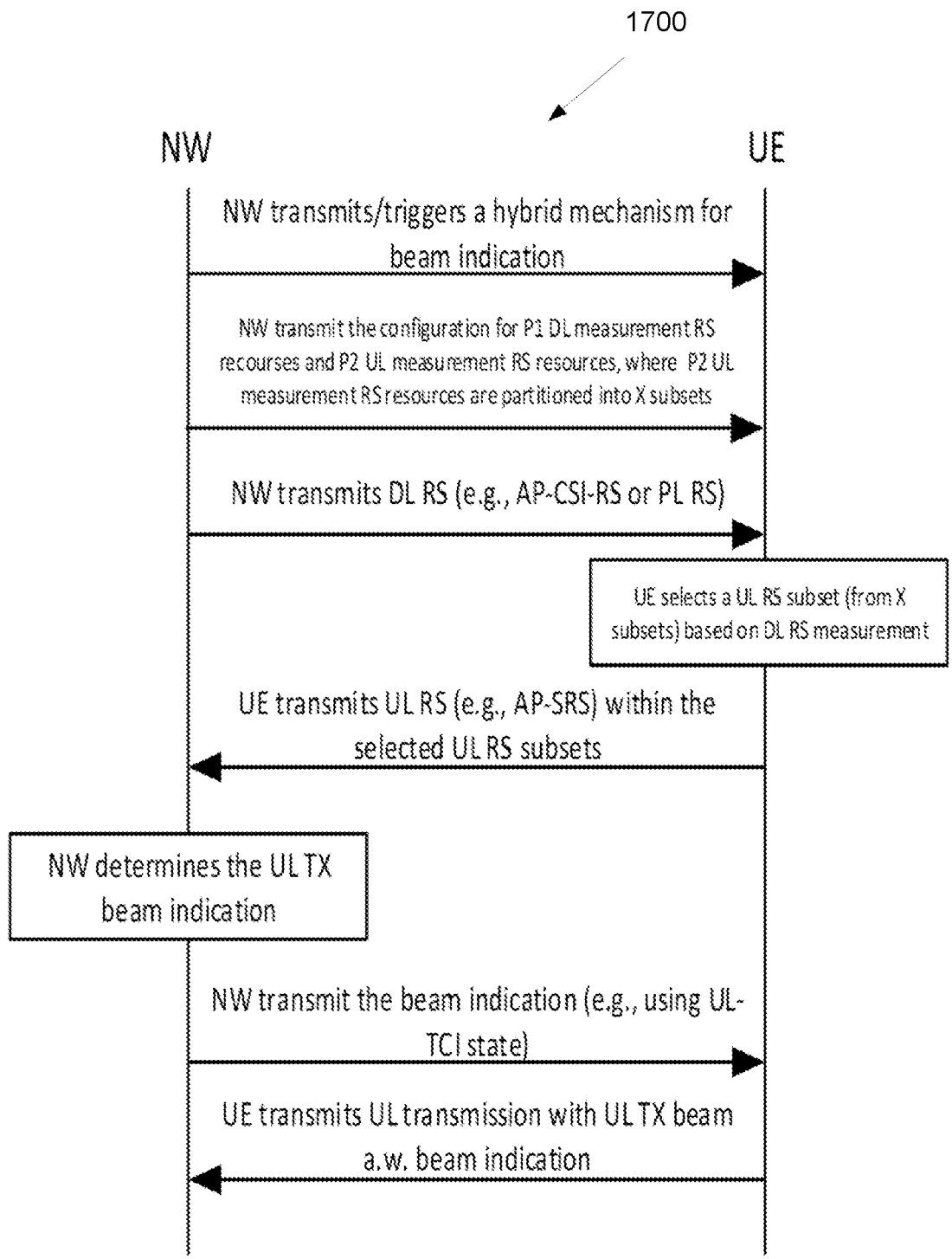
FIG. 17 illustrates a flow diagram illustrating UL TX beam selection according to embodiments of the present disclosure.

In one embodiment (II.2) illustrated in FIG. 17, a flow diagram illustrating UL TX beam selection 1700 is shown. The embodiment of the UL TX beam selection 1700 illustrated in FIG. 17 is for illustration only. FIG. 17 does not limit the scope of this disclosure to any particular implementation of the UL TX beam selection 1700.

As shown in FIG. 17, a UE is configured with a "hybrid UL TX beam selection mechanism", wherein the UE is configured to measure (receive) $P_1$ DL measurement RS resources (such as CSI-RS or SSB or PL RS), and use the measurement (based on the received DL measurement RS resources) to select one UL RS subset out of X subsets of UL RS resources, where the details about the DL RS measurement resources and their reception, and the UL subset selection are described in embodiment I.2 and/or sub-embodiments (I.2.1 through I.2.4) therein.

The UE also receives a configuration (either jointly or separately from the configuration for the DL RS resources) for $P_2$ UL measurement RS resources (such as SRS). The UE transmits the $P_2$ UL measurement RS resources using (from) the selected UL RS subset. Note that the number of transmission instances of the UL measurement RS resources is reduced when compared with the transmission from all subsets, which help reduce the latency associated with the UL RS measurement. As explained in embodiment I.2, the information about subset selection (e.g., subset ID) may or may not be provided (reported) by the UE to the NW/gNB. When reported, the information can be included in a beam report.

In one example, the linking (association) between the $P_1$ DL measurement RS resources (e.g., CSI-RS resources in a CSI-RS-ResourceSet) and $P_2$ UL measurement RS resources (e.g., SRS resources in a SRS-ResourceSet) are as described in embodiment I.2.

In one example, the subset selection is based on periodic DL RS measurements, where the periodicity (or periodicityAndOffset) of this subset selection can be fixed or configured, e.g., via RRC. The UE transmits the UL measurement RS resources using the subset selected based on the latest periodic DL RS measurements. In one example, the subset selection is based on aperiodic DL RS measurements, e.g., triggered via DCI. The UE transmits the UL measurement RS resources using the subset selected based on the latest aperiodic DL RS measurements. In one example, the subset selection is based on a SP DL RS measurements, e.g., activated via a MAC CE command. The UE transmits the UL measurement RS resources using the subset selected based on the latest SP DL RS measurements. Note that time domain behavior (AP, P, or SP) of the UL measurement RS resources may or may not be the same as that of the DL measurement RS resources.

The NW/gNB measures (receives) the UL measurement RS resources, and determines/transmits a UL TX beam indication to the UE for UL transmission, where the beam indication indicates $N \geq 1$ UL TX beam(s). The beam indication can be via UL-TCI or other functionally equivalent entity such as SpatialRelationInfo or SRI that is indicated via DCI and/or MAC CE and/or RRC. In one example N=1. In one example, N=2.

The UE receives the beam indication, and transmits UL transmission (e.g., PUSCH) using a UL TX beam associated with (a.w.) the beam indication.

Selection of $Y \geq 1$ Subsets

In one sub-embodiment (II.2.1), a UE is configured with a "hybrid UL TX beam selection mechanism", wherein the UE is configured to measure (receive) $P_1$ DL measurement RS resources (such as CSI-RS or SSB or PL RS), and use the measurement (based on the received DL measurement RS resources) to select Y UL RS subsets out of X subsets, where the details about the DL RS measurement resources and their reception, and the subset selection are described in sub-embodiment I.2.1. The UE also receives a configuration (either jointly or separately from the configuration for the DL RS resources) for $P_2$ UL measurement RS resources (such as SRS). The UE transmits the $P_2$ UL measurement RS resources using (from) the selected Y subset(s). The rest of the details (such as beam indication) are as described in embodiment I1.2.

In one sub-embodiment (II.2.2), a UE is configured to select one or $Y \geq 1$ UL RS subsets from X subsets, as described in embodiment I.2.2.

In one sub-embodiment (II.2.3), a UE is configured to receive DL measurement RS resources through/from E>1 entities, where the set of $P_1$ DL measurement RS resources can be partitioned into E subsets, as described in embodiment I.2.3.

In one sub-embodiment (II.2.4), a UE is configured to receive DL measurement RS resources through/from E>1 entities, where the set of $P_1$ DL measurement RS resources can be partitioned into E sets, as described in embodiment I.2.4.

Figure 18:
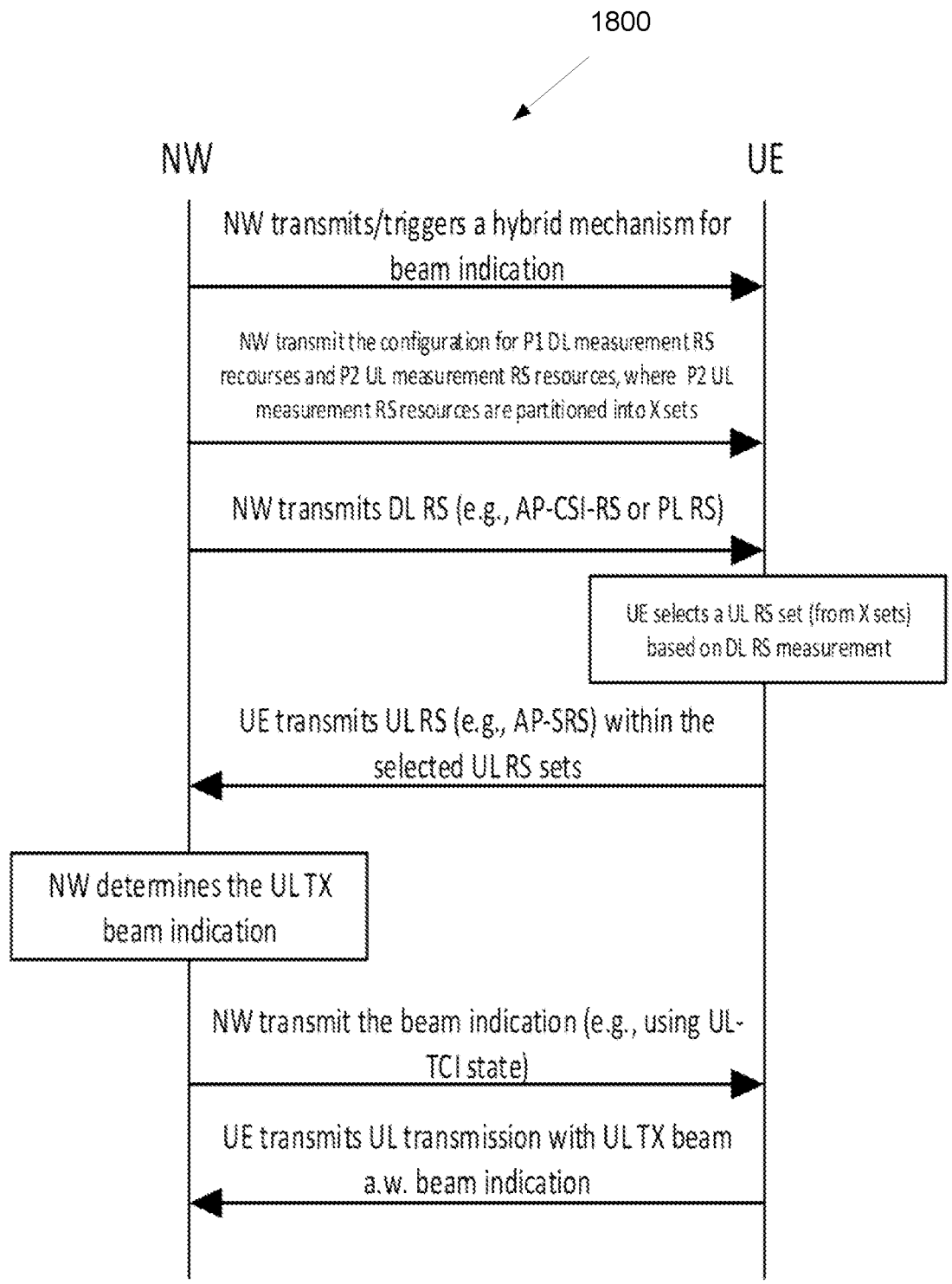
FIG. 18 illustrates a flow diagram illustrating UL TX beam selection according to embodiments of the present disclosure.

In one embodiment (II.3) illustrated in FIG. 18, a flow diagram illustrating UL TX beam selection 1800 is shown. The embodiment of the UL TX beam selection 1800 illustrated in FIG. 18 is for illustration only. FIG. 18 does not limit the scope of this disclosure to any particular implementation of the UL TX beam selection 1800.

As shown in FIG. 18, a UE is configured with a "hybrid UL TX beam selection mechanism", wherein the UE is configured to measure (receive) $P_1$ DL measurement RS resources (such as CSI-RS or SSB or PL RS), and use the measurement (based on the received DL measurement RS resources) to select one UL RS set out of X sets of UL RS resources, where the details about the DL RS measurement resources and their reception, and the UL set selection are described in embodiment I.3 and/or sub-embodiments (I.3.1 through I.3.4) therein.

The UE also receives a configuration (either jointly or separately from the configuration for the DL RS resources) for $P_2$ UL measurement RS resources (such as SRS). The UE transmits the $P_2$ UL measurement RS resources using (from) the selected UL RS set. Note that the number of transmission instances of the UL measurement RS resources is reduced when compared with the transmission from all sets, which help reduce the latency associated with the UL RS measurement. As explained in embodiment I.3, the information about set selection (e.g., set ID) may or may not be provided (reported) by the UE to the NW/gNB. When reported, the information can be included in a beam report.

In one example, the linking (association) between the $P_1$ DL measurement RS resources (e.g., CSI-RS resources in a CSI-RS-ResourceSet) and $P_2$ UL measurement RS resources (e.g., SRS resources in a SRS-ResourceSet) are as described in embodiment I.3.

In one example, the set selection is based on periodic DL RS measurements, where the periodicity (or periodicityAndOffset) of this set selection can be fixed or configured, e.g., via RRC. The UE transmits the UL measurement RS resources using the set selected based on the latest periodic DL RS measurements. In one example, the set selection is based on aperiodic DL RS measurements, e.g., triggered via DCI. The UE transmits the UL measurement RS resources using the set selected based on the latest aperiodic DL RS measurements. In one example, the set selection is based on a SP DL RS measurements, e.g., activated via a MAC CE command. The UE transmits the UL measurement RS resources using the set selected based on the latest SP DL RS measurements. Note that time domain behavior (AP, P, or SP) of the UL measurement RS resources may or may not be the same as that of the DL measurement RS resources.

The NW/gNB measures (receives) the UL measurement RS resources, and determines/transmits a UL TX beam indication to the UE for UL transmission, where the beam indication indicates $N \geq 1$ UL TX beam(s). The beam indication can be via UL-TCI or other functionally equivalent entity such as SpatialRelationInfo or SRI that is indicated via DCI and/or MAC CE and/or RRC. In one example N=1. In one example, N=2.

The UE receives the beam indication, and transmits UL transmission (e.g., PUSCH) using a UL TX beam associated with (a.w.) the beam indication.

Selection of $Y \geq 1$ Sets

In one sub-embodiment (II.3.1), a UE is configured with a "hybrid UL TX beam selection mechanism", wherein the UE is configured to measure (receive) $P_1$ DL measurement RS resources (such as CSI-RS or SSB or PL RS), and use the measurement (based on the received DL measurement RS resources) to select Y UL RS sets out of X sets, where the details about the DL RS measurement resources and their reception, and the set selection are described in sub-embodiment I.3.1. The UE also receives a configuration (either jointly or separately from the configuration for the DL RS resources) for $P_2$ UL measurement RS resources (such as SRS). The UE transmits the $P_2$ UL measurement RS resources using (from) the selected Y set(s). The rest of the details (such as beam indication) are as described in embodiment II.3.

In one sub-embodiment (II.3.2), a UE is configured to select one or Y≥1 UL RS sets from X sets, as described in embodiment I.3.2.

In one sub-embodiment (II.3.3), a UE is configured to receive DL measurement RS resources through/from E>1 entities, where the set of $P_1$ DL measurement RS resources can be partitioned into E sets, as described in embodiment I.3.3.

In one sub-embodiment (II.3.4), a UE is configured to receive DL measurement RS resources through/from E>1 entities, where the set of $P_1$ DL measurement RS resources can be partitioned into E sets, as described in embodiment I.3.4.

When the UE has multiple activated panels, as described in this disclosure, a subset of active panels can be used/configured for UL RS (SRS) or UL channel transmission or DL channel reception.

Any of the above variation embodiments can be utilized independently or in combination with at least one other variation embodiment.

Figure 19:
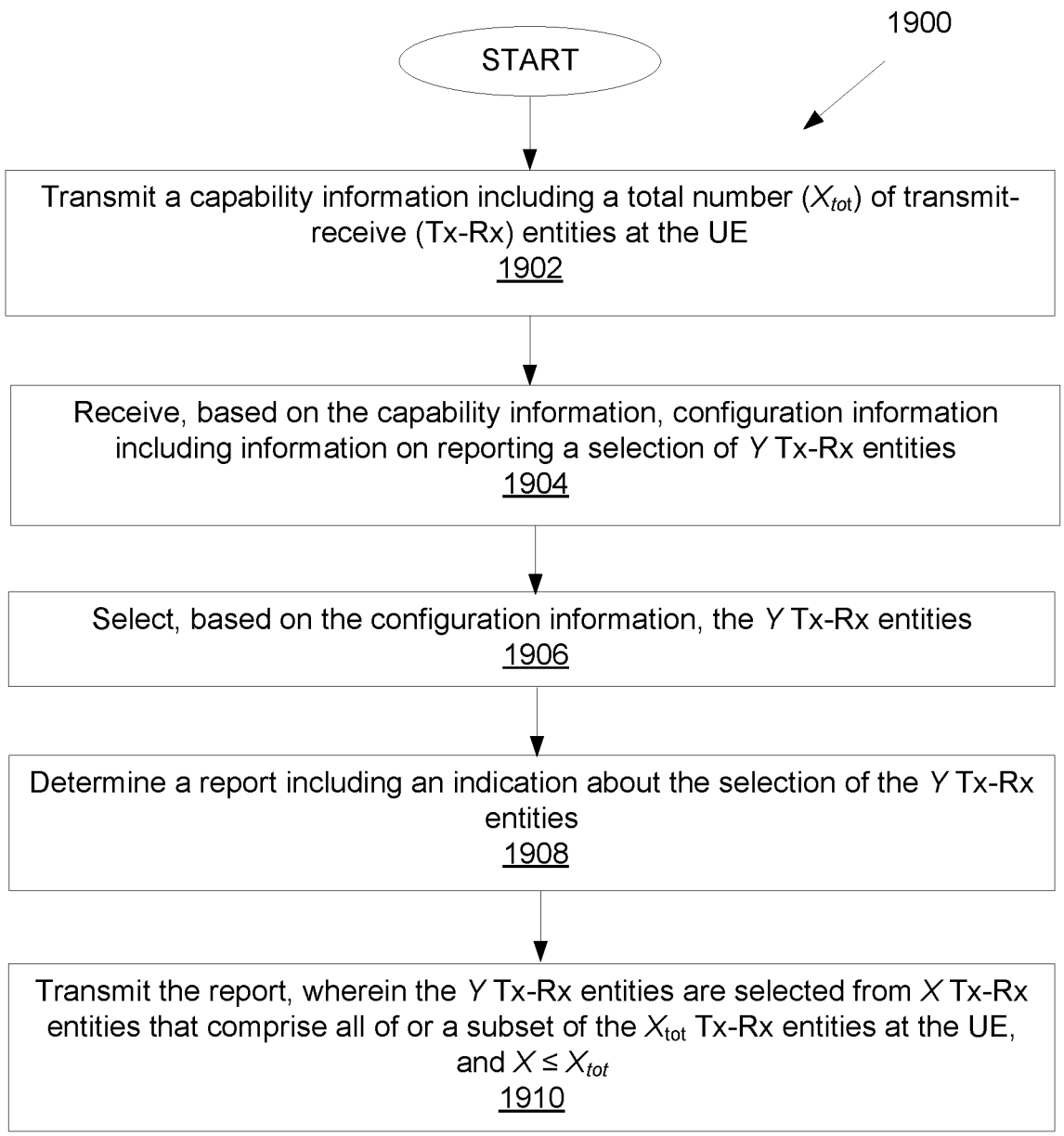
FIG. 19 illustrates a flow chart of a method for operating a UE according to embodiments of the present disclosure.

FIG. 19 illustrates a flow chart of a method 1900 for operating a user equipment (UE), as may be performed by a UE such as UE 116, according to embodiments of the present disclosure. The embodiment of the method 1900 illustrated in FIG. 19 is for illustration only. FIG. 18 does not limit the scope of this disclosure to any particular implementation.

As illustrated in FIG. 19, the method 1900 begins at step 1902. In step 1902, the UE (e.g., 111-116 as illustrated in FIG. 1) transmits a capability information including a total number ($X_{tot}$) of transmit-receive (Tx-Rx) entities at the UE.

In step 1904, the UE receives, based on the capability information, configuration information including information on reporting a selection of Y Tx-Rx entities.

In step 1906, the UE selects, based on the configuration information, the Y Tx-Rx entities.

In step 1908, the UE determines a report including an indication about the selection of the Y Tx-Rx entities.

In step 1910, the UE transmits the report, wherein the Y Tx-Rx entities are selected from X Tx-Rx entities that comprise all of or a subset of the $X_{tot}$ Tx-Rx entities at the UE, and $X \le X_{tot}$.

In one embodiment, a Tx-Rx entity of the $X_{tot}$ Tx-Rx entities corresponds to an antenna panel or group comprising antenna ports.

In one embodiment, a Tx-Rx entity of the $X_{tot}$ Tx-Rx entities is associated with a reference signal (RS) resource or a set of RS resources.

In one embodiment, when $X \le X_{tot}$, an information about the X Tx-Rx entities is configured.

In one embodiment, when $X=X_{tot}$: $Y=Y_{act}$=a number of activated Tx-Rx entities, and the UE selects the Y Tx-Rx entities based on an entity activation, where the entity activation determines a set of candidate Tx-Rx entities for downlink (DL) reception or uplink (UL) transmission.

In one embodiment, $X=Y_{act}$=a number of activated Tx-Rx entities, and the UE selects the Y Tx-Rx entities based on an entity selection, the $Y_{act}$ activated Tx-Rx entities comprise a set of candidate Tx-Rx entities for downlink (DL) reception or uplink (UL) transmission, and the entity selection determines the Tx-Rx entities actually used for DL reception or UL transmission.

In one embodiment, the configuration information includes information on measurement reference signal (RS) resources, and the UE receives the measurement RS resources, measures the measurement RS resources, and selects the Y Tx-Rx entities based on the measured measurement RS resources, and at least one of the measurement RS resources is a channel state information reference signal (CSI-RS) or a synchronization signal block (SSB).

In one embodiment, the UE receives configuration information on uplink (UL) measurement reference signal (RS) resources; transmits the UL measurement RS resources from at least one of the Y Tx-Rx entities; and receives a beam indication indicating N≥1 beams, wherein the beam indication is indicated based on the UL measurement RS resources.

Figure 20:
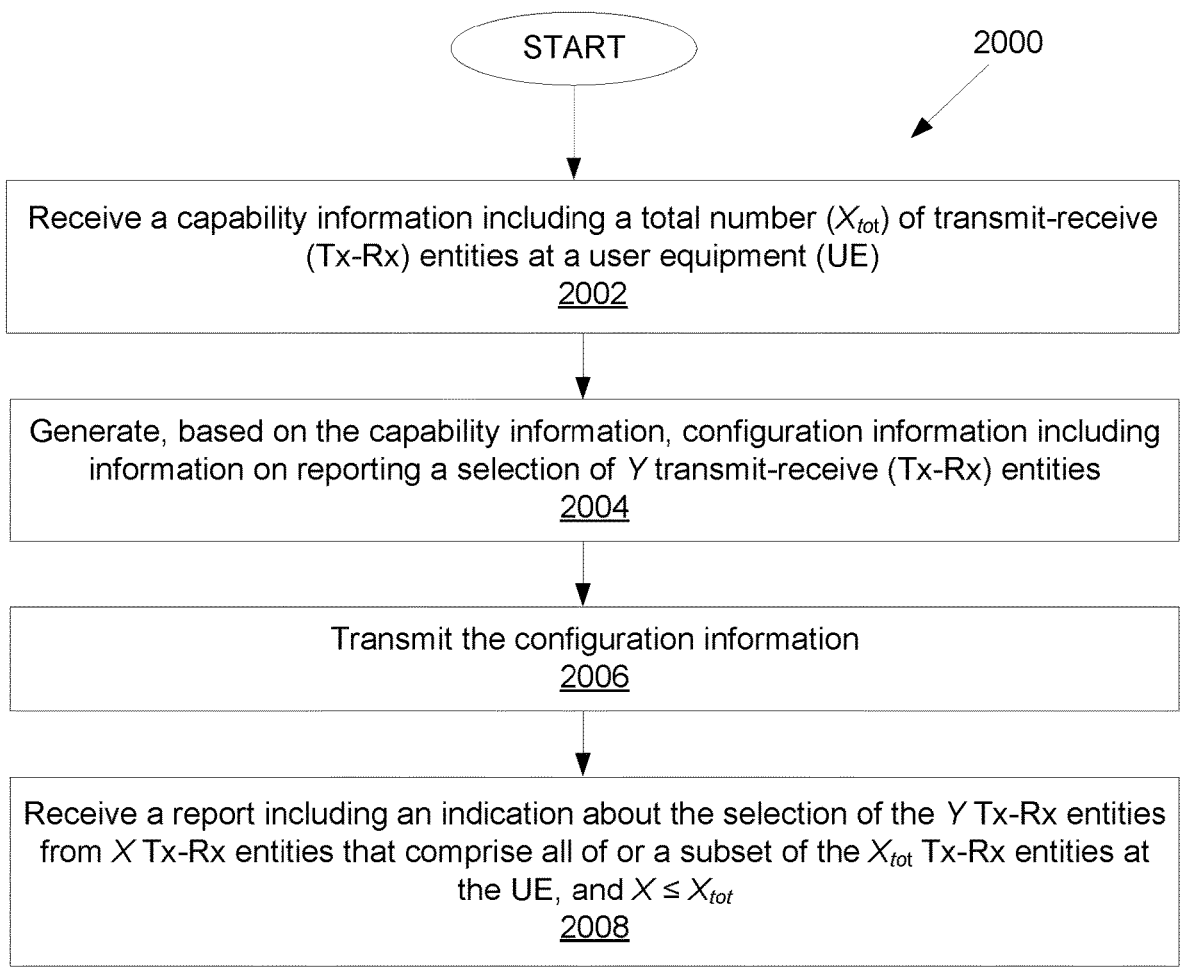
FIG. 20 illustrates a flow chart of a method for operating a BS according to embodiments of the present disclosure.

FIG. 20 illustrates a flow chart of another method 2000, as may be performed by a base station (BS) such as BS 102, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the BS (e.g., 101-103 as illustrated in FIG. 1), receives a capability information including a total number ($X_{tot}$) of transmit-receive (Tx-Rx) entities at a user equipment (UE).

In step 2004, the BS generates, based on the capability information, configuration information including information on reporting a selection of Y transmit-receive (Tx-Rx) entities.

In step 2006, the BS transmits the configuration information.

In step 2008, the BS receives a report including an indication about the selection of the Y Tx-Rx entities from X Tx-Rx entities that comprise all of or a subset of the $X_{tot}$ Tx-Rx entities at the UE, and $X \le X_{tot}$.

In one embodiment, a Tx-Rx entity of the $X_{tot}$ Tx-Rx entities corresponds to an antenna panel or group comprising antenna ports.

In one embodiment, a Tx-Rx entity of the $X_{tot}$ Tx-Rx entities is associated with a reference signal (RS) resource or a set of RS resources.

In one embodiment, when $X<X_{tot}$, an information about the X Tx-Rx entities is configured.

In one embodiment, when $X=X_{tot}$: $Y=Y_{act}$=a number of activated Tx-Rx entities, and the selection of the Y Tx-Rx entities is based on an entity activation, where the entity activation indicates a set of candidate Tx-Rx entities for downlink (DL) reception or uplink (UL) transmission.

In one embodiment, $X=Y_{act}$=a number of activated Tx-Rx entities, the selection of the Y Tx-Rx entities is based on an entity selection, the $Y_{act}$ activated Tx-Rx entities comprise a set of candidate Tx-Rx entities for downlink (DL) reception or uplink (UL) transmission, and the entity selection indicates the Tx-Rx entities actually used for DL reception or UL transmission.

In one embodiment, the configuration information includes information on measurement reference signal (RS) resources, the BS transmits the measurement RS resources, and at least one of the measurement RS resources is a channel state information reference signal (CSI-RS) or a synchronization signal block (SSB).

In one embodiment, the BS transmits configuration information on uplink (UL) measurement reference signal (RS) resources; receives the UL measurement RS resources from at least one of the Y Tx-Rx entities; and transmits a beam indication indicating N≥1 beams, wherein the beam indication is indicated based on the UL measurement RS resources.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver; and
a processor operatively coupled to the transceiver configured to:
control the transceiver to transmit, to a base station (BS) capability information including a total number of groups, wherein each group of the groups comprises antenna ports for a reference signal resource at the UE;
control the transceiver to receive, from the BS and based on the capability information, a radio resource control (RRC) message including configuration information for reporting at least one selected group of the groups; and
control the transceiver to transmit, to the BS, a report including information on the at least one selected group from the total number of groups, based on the configuration information,
wherein the report further includes at least one of:
a channel state information reference signal (CSI-RS) resource indicator (CRI) coupled with an associated reference signal received power (RSRP),
a synchronization signal block (SSB) index coupled with an associated signal to interference plus noise ratio (SINR),
a CRI coupled with an associated signal to interference plus noise ratio (SINR), and
an SSB index coupled with an associated SINR.

2. The UE of claim 1, wherein:
the RRC message includes configuration information for measurement of reference signal (RS) resources, and
the processor is further configured to measure the RS resources and select the at least one group from the total number of groups based on the measured RS resources,
wherein at least one of the measured RS resources is a channel state reference signal (CSI-RS) or a synchronization signal block (SSB).

3. The UE of claim 1, wherein, the reference signal resource is a sounding reference signal (SRS), and the antenna ports for the reference signal resource correspond to SRS ports associated with the SRS.

4. The UE of claim 1, wherein the transceiver is further configured to:
receive configuration information for at least one sounding reference signal (SRS) resource; and
transmit the at least one SRS resource.

5. A base station (BS) comprising:
a transceiver; and
a processor operatively coupled to the transceiver, the processor configured to:
control the transceiver to receive, from a user equipment (UE), capability information including a total number of groups, wherein each group of the groups comprises antenna ports for a reference signal resource at the UE;
control the transceiver to transmit, to the UE and based on the capability information, a radio resource control (RRC) message including configuration information for reporting at least one selected group of the groups; and
control the transceiver to receive, from the UE, a report including information on the at least one selected group from the total number of groups, based on the configuration information,
wherein the report further includes at least one of:
a channel state information reference signal (CSI-RS) resource indicator (CRI) coupled with an associated reference signal received power (RSRP),
a synchronization signal block (SSB) index coupled with an associated signal to interference plus noise ratio (SINR),
a CRI coupled with an associated signal to interference plus noise ratio (SINR), and
an SSB index coupled with an associated SINR.

6. The BS of claim 5, wherein:
the RRC message includes configuration information for measurement of reference signal (RS) resources, and
the processor is further configured to receive the report including the information on the at least one selected group from the total number of groups based on the measured RS resources,
wherein at least one of the measured RS resources is a channel state reference signal (CSI-RS) or a synchronization signal block (SSB).

7. The BS of claim 5, wherein the reference signal resource is a sounding reference signal (SRS), and the antenna ports for the reference signal resource correspond to SRS ports associated with the SRS.

8. The BS of claim 5, wherein the transceiver is further configured to:
transmit configuration information for at least one sounding reference signal (SRS) resource; and
receive the at least one SRS resource.

9. A method for operating a user equipment (UE), the method comprising:
transmitting, to a base station (BS), capability information including a total number of groups, wherein each group of the groups comprises antenna ports for a reference signal resource at the UE;
receiving, from the BS and based on the capability information, a radio resource control (RRC) message including configuration information for reporting at least one selected group of the groups; and
transmitting, to the BS, a report including information on the at least one selected group from the total number of groups, based on the configuration information,
wherein the report further includes at least one of:
a channel state information reference signal (CSI-RS) resource indicator (CRI) coupled with an associated reference signal received power (RSRP),
a synchronization signal block (SSB) index coupled with an associated signal to interference plus noise ratio (SINR), a CRI coupled with an associated signal to interference plus noise ratio (SINR), and an SSB index coupled with an associated SINR.

10. The method of claim 9, wherein:

the RRC message includes configuration information for measurement of reference signal (RS) resources, and the method further includes measuring the RS resources and selecting the at least one group from the total number of groups based on the measured RS resources, wherein at least one of the measured RS resources is a channel state reference signal (CSI-RS) or a synchronization signal block (SSB).

11. The method of claim 9, wherein the reference signal resource is a sounding reference signal (SRS), and the antenna ports for the reference signal resource correspond to SRS ports associated with the SRS.

12. The method of claim 9, further comprising:

receiving configuration information for at least one sounding reference signal (SRS) resource; and transmitting the at least one SRS resource.

* * * * *